US011503482B2

(12) United States Patent
Gupta et al.

(10) Patent No.: US 11,503,482 B2
(45) Date of Patent: Nov. 15, 2022

(54) TECHNIQUES FOR SWITCHING TO FALLBACK BEAM

(71) Applicant: QUALCOMM Incorporated, San Diego, CA (US)

(72) Inventors: Piyush Gupta, Bridgewater, NJ (US); Junyi Li, Chester, NJ (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 21 days.

(21) Appl. No.: 16/926,899

(22) Filed: Jul. 13, 2020

(65) Prior Publication Data

US 2021/0051495 A1 Feb. 18, 2021

Related U.S. Application Data

(60) Provisional application No. 62/886,231, filed on Aug. 13, 2019.

(51) Int. Cl.

| | |
|---|---|
| ***H04W 24/04*** | (2009.01) |
| ***H04L 1/18*** | (2006.01) |
| ***H04W 72/04*** | (2009.01) |
| ***H04W 72/12*** | (2009.01) |
| ***H04B 7/06*** | (2006.01) |

(52) U.S. Cl.

CPC .......... *H04W 24/04* (2013.01); *H04B 7/0626* (2013.01); *H04L 1/1812* (2013.01); *H04W 72/0406* (2013.01); *H04W 72/12* (2013.01)

(58) Field of Classification Search

None

See application file for complete search history.

(56) References Cited

U.S. PATENT DOCUMENTS

2013/0051265 A1* 2/2013 Barbieri ............ H04W 72/1273 370/252
2014/0293770 A1* 10/2014 Liu ......................... H04L 5/001 370/216
2018/0042000 A1* 2/2018 Zhang .................... H04B 7/088

(Continued)

FOREIGN PATENT DOCUMENTS

WO WO-2019013444 A1 1/2019
WO WO-2019047152 A1 3/2019

OTHER PUBLICATIONS

International Search Report and Written Opinion—PCT/US2020/041901—ISA/EPO—dated Dec. 15, 2020.

(Continued)

*Primary Examiner* — Steve R Young
(74) *Attorney, Agent, or Firm* — Holland & Hart LLP

(57) ABSTRACT

Methods, systems, and devices for wireless communications are described. Wireless devices may communicate over a primary and fallback beam. To support communications over a primary and fallback beam, a preconfiguration procedure may be performed to communicate to a transmitting and receiving device the identity of the primary and fallback beam. A central scheduling node may assist in identifying the primary and fallback beam for the transmitting and receiving device. During communications, the transmitting and receiving device may switch to the fallback beam when an initial communication fails and may perform a retransmission that includes data from the initial communication over the fallback beam.

28 Claims, 16 Drawing Sheets

(56) References Cited

U.S. PATENT DOCUMENTS

| | | | | |
|---|---|---|---|---|
| 2018/0091262 | A1* | 3/2018 | Jung | H04L 1/1812 |
| 2019/0181941 | A1* | 6/2019 | Kim | H04W 72/046 |
| 2019/0229852 | A1 | 7/2019 | Li et al. | |
| 2019/0306765 | A1* | 10/2019 | Cirik | H04W 36/0058 |
| 2019/0327751 | A1* | 10/2019 | Dong | H04W 72/042 |
| 2020/0036430 | A1* | 1/2020 | Kim | H04W 24/04 |
| 2020/0136680 | A1* | 4/2020 | Kim | H04B 7/0617 |
| 2020/0260231 | A1* | 8/2020 | Ganesan | H04B 7/0695 |
| 2021/0127365 | A1* | 4/2021 | Wang | H04W 72/085 |
| 2021/0250132 | A1* | 8/2021 | Chen | H04L 1/1819 |
| 2021/0368372 | A1* | 11/2021 | Chen | H04W 76/14 |
| 2022/0167180 | A1* | 5/2022 | Choi | H04L 1/1671 |

OTHER PUBLICATIONS

Partial International Search Report—PCT/US2020/041901—ISA/EPO—dated Oct. 20, 2020.

* cited by examiner

TECHNIQUES FOR SWITCHING TO FALLBACK BEAM

CROSS REFERENCE

The present Application for Patent claims the benefit of U.S. Provisional Patent Application No. 62/886,231 by GUPTA et al., entitled "TECHNIQUES FOR SWITCHING TO FALLBACK BEAM," filed Aug. 13, 2019, assigned to the assignee hereof, and expressly incorporated by reference in its entirety herein.

FIELD OF DISCLOSURE

The following relates generally to wireless communications, and more specifically to switching to a fallback beam.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

A wireless communications system may use ultra-reliable low latency communication (URLLC) techniques to exchange data between wireless devices—e.g., if wireless devices are in an operation or safety critical environment, such as a manufacturing facility or autonomous vehicle application. Techniques for increasing the reliability and reducing the latency of communications between wireless devices in operation critical environments may be desired.

SUMMARY

The present disclosure relates to improved techniques that support switching to a fallback beam. To increase the reliability and latency metrics of communications between devices, a transmitting and receiving device may preconfigure a primary and fallback transmission beam for subsequent coordinated switching between the primary and fallback transmission beams after a first transmission of user data fails.

A method for wireless communication at a UE is described. The method may include receiving a set of transmission beams, reporting CSI for the set of transmission beams, receiving an indication of a first transmission beam of the set of transmission beams based on the reported CSI, where the first transmission beam is configured to convey initial transmissions to the UE, identifying a second transmission beam of the set of transmission beams, wherein the second transmission beam is configured to convey retransmissions to the UE, failing to receive or decode, during a first interval, a first transmission of user data over the first transmission beam, transmitting a negative acknowledgment (NACK) message based on the failure to receive or decode the first transmission, and receiving, during a subsequent interval, a second transmission of the user data over the second transmission beam.

An apparatus for wireless communication at a UE is described. The apparatus may include a processor, memory coupled with the processor, and instructions stored in the memory. The instructions may be executable by the processor to cause the apparatus to receive a set of transmission beams, report CSI for the set of transmission beams, receive an indication of a first transmission beam of the set of transmission beams based on the reported CSI, where the first transmission beam is configured to convey initial transmissions to the UE, identify a second transmission beam of the set of transmission beams, wherein the second transmission beam is configured to convey retransmissions to the UE, fail to receive or decode, during a first interval, a first transmission of user data over the first transmission beam, transmit a negative acknowledgment (NACK) message based on the failure to receive or decode the first transmission, and receive, during a subsequent interval, a second transmission of the user data over the second transmission beam.

Another apparatus for wireless communication at a UE is described. The apparatus may include means for receiving a set of transmission beams, means for reporting CSI for the set of transmission beams, means for receiving an indication of a first transmission beam of the set of transmission beams based on the reported CSI, where the first transmission beam is configured to convey initial transmissions to the UE, means for identifying a second transmission beam of the set of transmission beams, wherein the second transmission beam is configured to convey retransmissions to the UE, means for failing to receive or decode, during a first interval, a first transmission of user data over the first transmission beam, means for transmitting a negative acknowledgment (NACK) message based on the failure to receive or decode the first transmission, and means for receiving, during a subsequent interval, a second transmission of the user data over the second transmission beam.

A non-transitory computer-readable medium storing code for wireless communication at a UE is described. The code may include instructions executable by a processor to receive a set of transmission beams, report CSI for the set of transmission beams, receive an indication of a first transmission beam of the set of transmission beams based on the reported CSI, where the first transmission beam is configured to convey initial transmissions to the UE, identify a second transmission beam of the set of transmission beams, wherein the second transmission beam is configured to convey retransmissions to the UE, fail to receive or decode, during a first interval, a first transmission of user data over the first transmission beam, transmit a negative acknowledgment (NACK) message based on the failure to receive or decode the first transmission, and receive, during a subsequent interval, a second transmission of the user data over the second transmission beam.

Some examples of the method, apparatuses, and non-transitory computer-readable medium described herein may further include operations, features, means, or instructions for switching from a first receive beam that corresponds to the first transmission beam to a second receive beam that corresponds to the second transmission beam based on transmitting the NACK message.

Some examples of the method, apparatuses, and non-transitory computer-readable medium described herein may further include operations, features, means, or instructions for receiving an indication of a set of periodic intervals during which the UE may be scheduled to receive initial transmissions of user data, where the set of periodic intervals includes the first interval.

In some examples of the method, apparatuses, and non-transitory computer-readable medium described herein, receiving the second transmission of the user data during the subsequent interval may include operations, features, means, or instructions for receiving control information in a control channel that indicates a location of the user data in a data channel.

In some examples of the method, apparatuses, and non-transitory computer-readable medium described herein, a spatial diversity between the first transmission beam and the second transmission beam exceeds a threshold.

In some examples of the method, apparatuses, and non-transitory computer-readable medium described herein, the indication indicates the second transmission beam.

In some examples of the method, apparatuses, and non-transitory computer-readable medium described herein, receiving the indication of the first transmission beam includes receiving a control message comprising a first field for indicating the first transmission beam for the first transmission and a second field for indicating the second transmission beam for the second transmission.

In some examples of the method, apparatuses, and non-transitory computer-readable medium described herein, identifying the second transmission beam includes determining a mapping between the first transmission beam and the second transmission beam based on a table.

A method for wireless communication at a wireless device is described. The method may include transmitting a set of transmission beams, receiving CSI for the set of transmission beams, the CSI including CSI reported by a UE, identifying a first transmission beam and a second transmission beam of the set of transmission beams based on the CSI, transmitting, to the UE, an indication of the first transmission beam based on the reported CSI, where the first transmission beam is configured to convey initial transmissions to the UE and the second transmission beam is configured to convey retransmissions to the UE, transmitting, to the UE during a first interval, a first transmission of user data over the first transmission beam, failing to receive or decode an acknowledgment (ACK) message in response to the first transmission, and transmitting, to the UE during a subsequent interval, a second transmission of the user data over the second transmission beam based on the failure to receive or decode the ACK message.

An apparatus for wireless communication at a wireless device is described. The apparatus may include a processor, memory coupled with the processor, and instructions stored in the memory. The instructions may be executable by the processor to cause the apparatus to transmit a set of transmission beams, receive CSI for the set of transmission beams, the CSI including CSI reported by a UE, identify a first transmission beam and a second transmission beam of the set of transmission beams based on the CSI, transmit, to the UE, an indication of the first transmission beam based on the reported CSI, where the first transmission beam is configured to convey initial transmissions to the UE and the second transmission beam is configured to convey retransmissions to the UE, transmit, to the UE during a first interval, a first transmission of user data over the first transmission beam, fail to receive or decode an acknowledgment (ACK) message in response to the first transmission, and transmit, to the UE during a subsequent interval, a second transmission of the user data over the second transmission beam based on the failure to receive or decode the ACK message.

Another apparatus for wireless communication at a wireless device is described. The apparatus may include means for transmitting a set of transmission beams, means for receiving CSI for the set of transmission beams, the CSI including CSI reported by a UE, means for identifying a first transmission beam and a second transmission beam of the set of transmission beams based on the CSI, means for transmitting, to the UE, an indication of the first transmission beam based on the reported CSI, where the first transmission beam is configured to convey initial transmissions to the UE and the second transmission beam is configured to convey retransmissions to the UE, means for transmitting, to the UE during a first interval, a first transmission of user data over the first transmission beam, means for failing to receive or decode an acknowledgment (ACK) message in response to the first transmission, and means for transmitting, to the UE during a subsequent interval, a second transmission of the user data over the second transmission beam based on the failure to receive or decode the ACK message.

A non-transitory computer-readable medium storing code for wireless communication at a wireless device is described. The code may include instructions executable by a processor to transmit a set of transmission beams, receive CSI for the set of transmission beams, the CSI including CSI reported by a UE, identify a first transmission beam and a second transmission beam of the set of transmission beams based on the CSI, transmit, to the UE, an indication of the first transmission beam based on the reported CSI, where the first transmission beam is configured to convey initial transmissions to the UE and the second transmission beam is configured to convey retransmissions to the UE, transmit, to the UE during a first interval, a first transmission of user data over the first transmission beam, fail to receive or decode an acknowledgment (ACK) message in response to the first transmission, and transmit, to the UE during a subsequent interval, a second transmission of the user data over the second transmission beam based on the failure to receive or decode the ACK message.

In some examples of the method, apparatuses, and non-transitory computer-readable medium described herein, transmitting the set of transmission beams may include operations, features, means, or instructions for transmitting the first transmission beam from a first transmission/reception point (TRP) and the second transmission beam from a second TRP.

Some examples of the method, apparatuses, and non-transitory computer-readable medium described herein may further include operations, features, means, or instructions for computing a set of spatial diversity values between transmission beams of the set of transmission beams, and selecting the first transmission beam and the second transmission beam based on determining that a spatial diversity value computed between the first transmission beam and the second transmission beam exceeds a threshold.

Some examples of the method, apparatuses, and non-transitory computer-readable medium described herein may further include operations, features, means, or instructions for computing a set of channel quality values for the set of transmission beams based on the CSI reported by the UE, where computing the set of spatial diversity values includes computing the set of spatial diversity values between transmission beams of a subset of the set of transmission beams having channel quality values exceeding a second threshold, where the subset of the set of transmission beams includes the first transmission beam and the second transmission beam.

In some examples of the method, apparatuses, and non-transitory computer-readable medium described herein, the CSI may include operations, features, means, or instructions for transmitting, to the second UE, a second indication of the first transmission beam and the second transmission beam based on the reported CSI, where the first transmission beam may be configured to convey initial transmissions from the second UE to the UE and the second transmission beam may be configured to convey retransmissions from the second UE to the UE.

In some examples of the method, apparatuses, and non-transitory computer-readable medium described herein, receiving the CSI may include operations, features, means, or instructions for receiving the CSI reported by the UE from a base station.

In some examples of the method, apparatuses, and non-transitory computer-readable medium described herein, identifying the first transmission beam and the second transmission beam may include operations, features, means, or instructions for receiving the indication of the first transmission beam and the second transmission beam from the base station.

Some examples of the method, apparatuses, and non-transitory computer-readable medium described herein may further include operations, features, means, or instructions for transmitting an indication of a set of periodic intervals during which the UE may be scheduled to receive initial transmissions of user data, where the set of periodic intervals includes the first interval.

In some examples of the method, apparatuses, and non-transitory computer-readable medium described herein, transmitting the second transmission of the user data during the subsequent interval may include operations, features, means, or instructions for transmitting control information in a control channel that indicates a location of the user data in a data channel.

In some examples of the method, apparatuses, and non-transitory computer-readable medium described herein, a spatial diversity between the first transmission beam and the second transmission beam exceeds a threshold.

In some examples of the method, apparatuses, and non-transitory computer-readable medium described herein, the indication indicates the second transmission beam.

Some examples of the method, apparatuses, and non-transitory computer-readable medium described herein may further include operations, features, means, or instructions for generating a table that provides mappings between primary and fallback transmission beams based on the CSI, and transmitting, to the UE, the table, wherein the table includes a mapping between the first transmission beam and the second transmission beam.

A method for wireless communication at a first UE is described. The method may include transmitting a set of transmission beams, receiving, from a base station, an indication of a first transmission beam of the set of transmission beams based on CSI reported to the base station by a second UE, where the first transmission beam is configured to convey initial transmissions from the first UE to the second UE; identifying a second transmission beam of the set of transmission beams based on the indication, wherein the second transmission beam is configured to convey retransmissions from the first UE to the second UE, transmitting, to the second UE during a first interval, a first transmission of user data over the first transmission beam, failing to receive or decode an acknowledgment (ACK) message in response to the first transmission, and transmitting, to the second UE during a subsequent interval, a second transmission of the user data over the second transmission beam based on the failure to receive or decode the ACK message.

An apparatus for wireless communication at a first UE is described. The apparatus may include a processor, memory coupled with the processor, and instructions stored in the memory. The instructions may be executable by the processor to cause the apparatus to transmit a set of transmission beams, receive, from a base station, an indication of a first transmission beam of the set of transmission beams based on CSI reported to the base station by a second UE, where the first transmission beam is configured to convey initial transmissions from the first UE to the second UE; identifying a second transmission beam of the set of transmission beams based on the indication, wherein the second transmission beam is configured to convey retransmissions from the first UE to the second UE, transmit, to the second UE during a first interval, a first transmission of user data over the first transmission beam, fail to receive or decode an acknowledgment (ACK) message in response to the first transmission, and transmit, to the second UE during a subsequent interval, a second transmission of the user data over the second transmission beam based on the failure to receive or decode the ACK message.

Another apparatus for wireless communication at a first UE is described. The apparatus may include means for transmitting a set of transmission beams, means for receiving, from a base station, an indication of a first transmission beam of the set of transmission beams based on CSI reported to the base station by a second UE, where the first transmission beam is configured to convey initial transmissions from the first UE to the second UE; identifying a second transmission beam of the set of transmission beams based on the indication, wherein the second transmission beam is configured to convey retransmissions from the first UE to the second UE, means for transmitting, to the second UE during a first interval, a first transmission of user data over the first transmission beam, means for failing to receive or decode an acknowledgment (ACK) message in response to the first transmission, and means for transmitting, to the second UE during a subsequent interval, a second transmission of the user data over the second transmission beam based on the failure to receive or decode the ACK message.

A non-transitory computer-readable medium storing code for wireless communication at a first UE is described. The code may include instructions executable by a processor to transmit a set of transmission beams, receive, from a base station, an indication of a first transmission beam of the set of transmission beams based on CSI reported to the base station by a second UE, where the first transmission beam is configured to convey initial transmissions from the first UE to the second UE; identifying a second transmission beam of the set of transmission beams based on the indication, wherein the second transmission beam is configured to convey retransmissions from the first UE to the second UE, transmit, to the second UE during a first interval, a first transmission of user data over the first transmission beam, fail to receive or decode an acknowledgment (ACK) message in response to the first transmission, and transmit, to the second UE during a subsequent interval, a second transmission of the user data over the second transmission beam based on the failure to receive or decode the ACK message.

Some examples of the method, apparatuses, and non-transitory computer-readable medium described herein may further include operations, features, means, or instructions for switching from the first transmission beam to the second transmission beam based on failing to receive or decode the ACK message.

Some examples of the method, apparatuses, and non-transitory computer-readable medium described herein may further include operations, features, means, or instructions for transmitting an indication of a set of periodic intervals during which the second UE may be scheduled to receive initial transmissions of user data, where the set of periodic intervals includes the first interval.

In some examples of the method, apparatuses, and non-transitory computer-readable medium described herein, transmitting the second transmission of the user data during the subsequent interval may include operations, features, means, or instructions for transmitting control information in a control channel that indicates a location of the user data in a data channel.

In some examples of the method, apparatuses, and non-transitory computer-readable medium described herein, a spatial diversity between the first transmission beam and the second transmission beam exceeding a threshold.

In some examples of the method, apparatuses, and non-transitory computer-readable medium described herein, the indication indicates the second transmission beam.

In some examples of the method, apparatuses, and non-transitory computer-readable medium described herein, identifying the second transmission beam includes determining a mapping between the first transmission beam and the second transmission beam based on a table.

A method for wireless communication at a first UE is described. The method may include receiving a set of transmission beams, reporting channel state information (CSI) for the set of transmission beams, receiving an indication of a first transmission beam of the set of transmission beams based on the reported CSI, wherein the first transmission beam is configured to convey initial transmissions to the UE, identifying a second transmission beam of the set of transmission beams based on the indication, wherein the second transmission beam is configured to convey retransmissions to the UE, transmitting, to the second UE during a first interval, a first transmission of user data over the first transmission beam, receiving a negative acknowledgment (NACK) message based on the first transmission, and transmitting, during a subsequent interval, a second transmission of the user data over the second transmission beam based on receiving the NACK message.

An apparatus for wireless communication at a first UE is described. The apparatus may include a processor, memory coupled with the processor, and instructions stored in the memory. The instructions may be executable by the processor to cause the apparatus to receive a set of transmission beams, report CSI for the set of transmission beams, receive an indication of a first transmission beam of the set of transmission beams based on the reported CSI, wherein the first transmission beam is configured to convey initial transmissions to the UE, identify a second transmission beam of the set of transmission beams based on the indication, wherein the second transmission beam is configured to convey retransmissions to the UE, transmit, to the second UE during a first interval, a first transmission of user data over the first transmission beam, receive a negative acknowledgment (NACK) message based on the first transmission, and transmit, during a subsequent interval, a second transmission of the user data over the second transmission beam based on receiving the NACK message.

Another apparatus for wireless communication at a first UE is described. The apparatus may include means for receiving a set of transmission beams, reporting CSI for the set of transmission beams, means for receiving an indication of a first transmission beam of the set of transmission beams based on the reported CSI, wherein the first transmission beam is configured to convey initial transmissions to the UE, means for identifying a second transmission beam of the set of transmission beams based on the indication, wherein the second transmission beam is configured to convey retransmissions to the UE, means for transmitting, to the second UE during a first interval, a first transmission of user data over the first transmission beam, means for receiving a negative acknowledgment (NACK) message based on the first transmission, and means for transmitting, during a subsequent interval, a second transmission of the user data over the second transmission beam based on receiving the NACK message.

A non-transitory computer-readable medium storing code for wireless communication at a first UE is described. The code may include instructions executable by a processor to receive a set of transmission beams, report CSI for the set of transmission beams, receive an indication of a first transmission beam of the set of transmission beams based on the reported CSI, wherein the first transmission beam is configured to convey initial transmissions to the UE, identify a second transmission beam of the set of transmission beams based on the indication, wherein the second transmission beam is configured to convey retransmissions to the UE, transmit, to the second UE during a first interval, a first transmission of user data over the first transmission beam, receive a negative acknowledgment (NACK) message based on the first transmission, and transmit, during a subsequent interval, a second transmission of the user data over the second transmission beam based on receiving the NACK message.

In some examples of the method, apparatuses, and non-transitory computer-readable medium described herein, the indication indicates the second transmission beam.

In some examples of the method, apparatuses, and non-transitory computer-readable medium described herein, identifying the second transmission beam includes determining a mapping between the first transmission beam and the second transmission beam based on a table.

DETAILED DESCRIPTION

Figure 1:
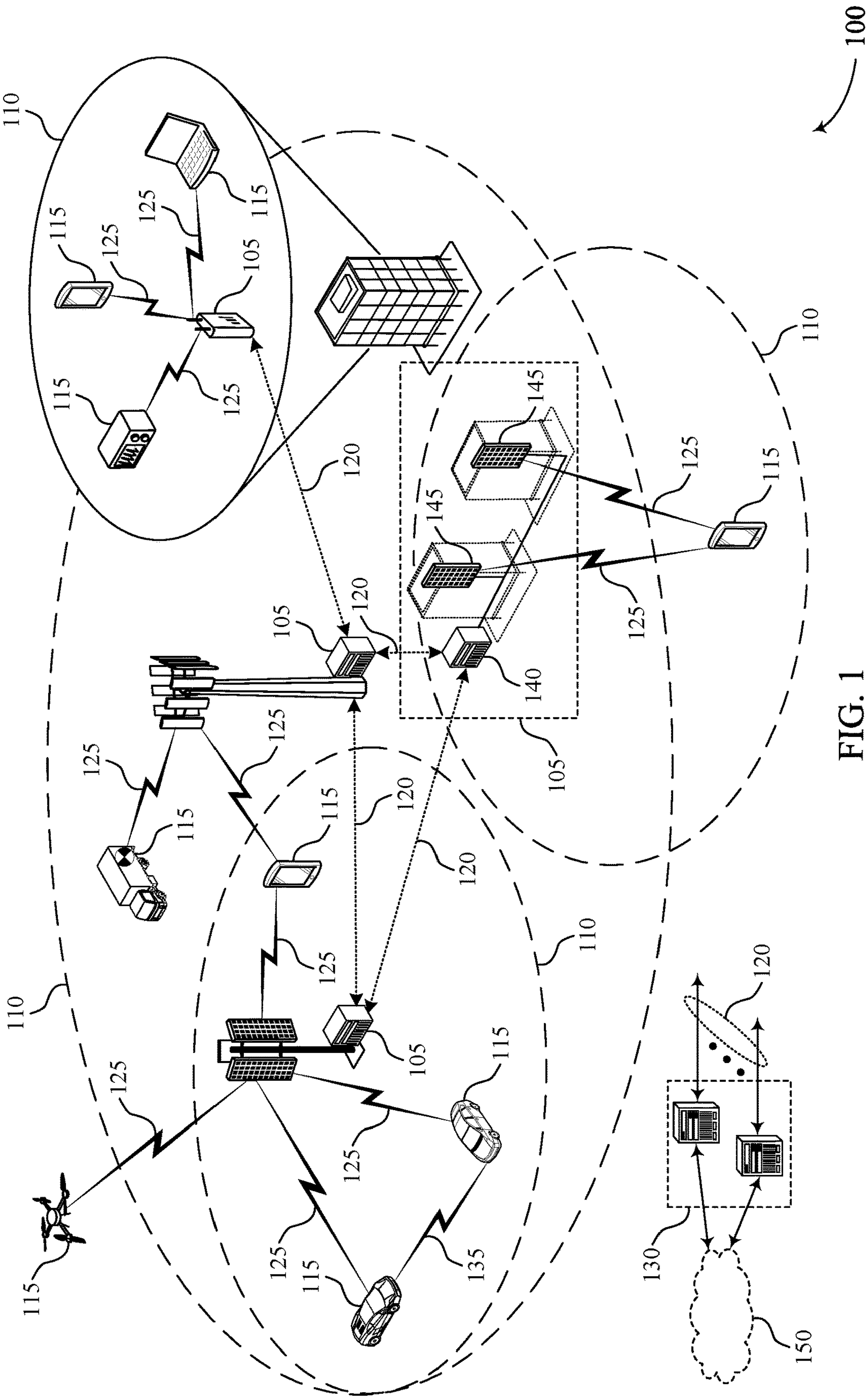
FIG. 1 illustrates an example of a wireless communications system that supports switching to a fallback beam in accordance with various aspects of the present disclosure.

Operation critical wireless communications systems may use ultra-reliable low latency communication (URLLC) techniques to wirelessly communicate data between devices. Operation critical communications may include communications between automated components in a factory environment (e.g., a manufacturing facility). For example, URLLCs may be desired between a customized controller that is configured to issue commands based on sensor input (e.g., a Programmable Logic Controller (PLC)) and sensing and/or actuating (S/A) components. In some cases, operation critical communications systems use beamformed transmissions and millimeter wave technology to convey information between devices.

To meet reliability and low-latency demands, initial data transmissions between a PLC and S/A component may be transmitted during periodically scheduled resources and retransmissions of data that was unsuccessfully communicated between the devices may be performed in immediately subsequent control channel scheduled transmissions. In some cases, initial transmissions of data fail as a result of a blockage entering a path of a transmission beam used to transmit data between devices. In automated factory environments, manufacturing components (e.g., a robotic arm) may frequently enter transmission paths between wireless devices for transitory or extended periods of time. Accordingly, retransmissions of failed data using the same transmission beam may similarly fail if the blockage remains in the transmission path. Initial transmission and retransmission failures caused by constant blockages may result in the packet error rate of the communications system exceeding minimum error rate standards and/or the time for delivering data between devices exceeding latency standards.

To increase the reliability and reduce the latency of transmissions in the presence of constant blockages, a wireless communications system may utilize fallback transmission beams to convey retransmissions of data that failed to be communicated between wireless devices on primary transmission beams.

For example, a primary transmission beam may be used for initial data transmissions between wireless devices and a fallback transmission beam may be used for retransmissions of data that failed to be conveyed in the initial data transmission. In some cases, to support transmissions over a primary and fallback transmission beam, a preconfiguration procedure may be used to enable the wireless devices to switch between the primary transmission beam and the fallback transmission beam in a coordinated fashion. That is, the primary transmission beam and the fallback transmission beam may be identified before communications between the wireless devices are performed—e.g., a transmitting device may identify the primary and fallback transmission beams based on channel state information (CSI) reported from the receiving device for multiple transmission beams transmitted from the transmitting device, in addition to calculations of spatial diversity between the multiple transmission beams. After the primary and fallback transmission beam are identified, the identity of the primary and fallback transmission beams may be shared between the wireless devices. Accordingly, during subsequent communications, the wireless devices may perform initial data transmission over the primary transmission beam and may switch to the fallback transmission beam for retransmissions of data after an initial transmission of data fails—e.g., if a receiving device fails to receive or decode the data in a scheduled interval.

In some examples, similar techniques are used for direct transmissions between user devices (or "sidelink communications"). In some cases, a user device (e.g., a PLC) may similarly perform and manage a preconfiguration procedure with another user device (e.g., an S/A component). In other cases, to support sidelink transmissions over a primary and fallback transmission beam, a preconfiguration procedure that involves a central scheduling node (e.g., a base station) is used to enable the user devices to switch between the primary transmission beam and the fallback transmission beam in a coordinated fashion. For example, the central scheduling node may identify a primary and fallback transmission beam for sidelink transmissions between user devices based on CSI reported by one or both of the user devices. After identifying the primary and fallback transmission beam for sidelink transmissions, the central scheduling node may indicate to the user devices the identity of the primary and fallback transmission beams. Accordingly, during communications, the user devices may perform initial data sidelink transmissions over the primary transmission beam and may switch to the fallback transmission beam for sidelink retransmissions of data after an initial transmission of data fails.

Aspects of the disclosure are initially described in the context of a wireless communications system and wireless communications subsystems. Specific examples are then described of communication resource structures that support switching to a fallback beam and process flows showing a series of operations that occur when switching to a fallback beam Aspects of the disclosure are further illustrated by and described with reference to apparatus diagrams, system diagrams, and flowcharts that relate to switching to a fallback beam.

FIG. 1 illustrates an example of a wireless communications system that supports switching to a fallback beam in accordance with various aspects of the present disclosure.

The wireless communications system 100 may include base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, the wireless communications system 100 may support enhanced broadband communications, ultra-reliable (e.g., mission critical) communications, low latency communications, communications with low-cost and low-complexity devices, or any combination thereof.

Base stations 105 may be dispersed throughout a geographic area to form the wireless communications system 100 and may be devices in different forms or having different capabilities. Base stations 105 and UEs 115 may wirelessly communicate via one or more communication links 125. Each base station 105 may provide a geographic coverage area 110 over which UEs 115 and the base station 105 may establish communication links 125. The geographic coverage area 110 may be an example of a geographic area over which a base station 105 and a UE 115 support the communication of signals according to one or more radio access technologies.

UEs 115 may be dispersed throughout a geographic coverage area 110 of the wireless communications system 100, and each UE 115 may be stationary, or mobile, or both at different times. UEs 115 may be devices in different forms or having different capabilities. Some example UEs 115 are illustrated in FIG. 1. The UEs 115 described herein may be able to communicate with various types of devices, such as other UEs 115, base stations 105, and/or network equipment (e.g., core network nodes, relay devices, integrated access and backhaul (IAB) nodes, or other network equipment), as shown in FIG. 1.

Base stations 105 may communicate with the core network 130, or with one another, or both. For example, base stations 105 may interface with the core network 130 through backhaul links 120 (e.g., via an S1, N2, N3, or other interface). Base stations 105 may communicate with one another over backhaul links 120 (e.g., via an X2, Xn, or other interface) either directly (e.g., directly between base stations 105), or indirectly (e.g., via core network 130), or both. In some examples, backhaul links 120 may be or include one or more wireless links.

One or more of base stations 105 described herein may include or may be referred to by a person of ordinary skill in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, a machine type communications (MTC) device, or the like, which may be implemented in various objects such as appliances, vehicles, meters, or the like.

The UEs 115 described herein may be able to communicate with various types of devices, such as other UEs 115 that may sometimes act as relays as well as base stations 105 and network equipment including macro eNBs or gNBs, small cell eNBs or gNBs, relay base stations, and the like, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting communication links 125. For example, a carrier used for a communication link 125 may include a portion of a radio frequency spectrum band (e.g., a bandwidth part (BWP)) that is operated according to physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

Time intervals for base stations 105 or UEs 115 may be expressed in multiples of a basic time unit which may, for example, refer to a sampling period of $T_S=1/(\Delta f_{max}\cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some cases, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some cases, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of UEs 115. For example, UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, overlapping geographic coverage areas 110 associated with different technologies may be supported by different base stations 105. The wireless communications system 100 may include, for example, a heterogeneous network in which different types of base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable, low latency, or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or commercial applications. The terms ultra-reliable, low-latency, mission critical, and ultra-reliable low-latency may be used interchangeably herein.

In some cases, a UE 115 may also be able to communicate directly with other UEs 115 over a device-to-device (D2D) communication link 135 (e.g., using a peer-to-peer (P2P) or D2D protocol), which may also be referred to as a sidelink. One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some cases, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), a user plane function (UPF)). The control plane entity may manage non-access stratum (NAS) functions such as mobility, authentication, and bearer management for UEs 115 served by base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with UEs 115 through a number of other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands—e.g., in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features, but the waves may penetrate structures sufficiently for a macro cell to provide service to UEs 115 located indoors. Transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between UEs 115 and base stations 105, and EHF antennas of the respective devices may be smaller and more closely spaced than UHF antennas. In some cases, this may facilitate use of antenna arrays within a device. The propagation of EHF transmissions, however, may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some cases, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, D2D transmissions, or the like.

A base station 105 or UE 115 may be equipped with multiple antennas, which may be used to employ techniques such as transmit diversity, receive diversity, multiple-input multiple-output (MIMO) communications, or beamforming. The antennas of a base station 105 or UE 115 may be located within one or more antenna arrays or antenna panels, which may support MIMO operations or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Base stations 105 or UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at first orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with an orientation (e.g., with respect to the antenna array of the transmitting device or receiving device, or with respect to some other orientation).

A base station 105 or UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or a receiving device, such as a UE 115) a beam direction for subsequent transmission and/or reception by the base station 105.

Some signals, such as data signals associated with a receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in different beam directions. For example, a UE 115 may receive one or more of the signals transmitted by the base station 105 in different directions and may report to the base station 105 an indication of the signal that the UE 115 received with a highest signal quality, or an otherwise acceptable signal quality.

In some cases, transmissions by a device (e.g., by a base station 105 or UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

UEs 115 and base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some cases, a device may support same-slot HARQ feedback, where the device may provide HARQ feedback in a specific slot for data received in a previous symbol in the slot. In other cases, the device may provide HARQ feedback in a subsequent slot, or according to some other time interval.

Operation critical communications systems may use URLLC techniques to wirelessly communicate data between devices. Operation critical communications may include communications between automated components in a factory environment (e.g., a manufacturing facility). For example, URLLCs may be desired between a customized controller that is configured to issue commands based on sensor input (or PLC) and a S/A component. In some cases, operation critical communications systems use beamformed transmissions and millimeter wave technology to convey information between devices.

To meet reliability and low-latency demands, initial data transmissions between a PLC and S/A component may be transmitted during periodically scheduled resources and retransmissions of data that was unsuccessfully received may be performed in immediately subsequent control channel scheduled transmissions. In some cases, initial transmissions of data fail as a result of a blockage entering a path of a transmission beam used to transmit data between devices. In automated factory environments, manufacturing components (e.g., a robotic arm) may frequently enter transmission paths between wireless devices for transitory or extended periods of time. Accordingly, retransmissions of failed data that use the same transmission beam as the initial transmission of the data may similarly fail if the blockage remains in the transmission path. Initial transmission and retransmission failures caused by constant blockages may result in the packet error rate of the communications system to exceed minimum error rate standards and/or the time for delivering data between devices to exceed latency standards.

To increase the reliability and latency of transmissions in the presence of constant blockages, a communications system may utilize fallback transmission beams to convey retransmitted data between devices.

Figure 2A:
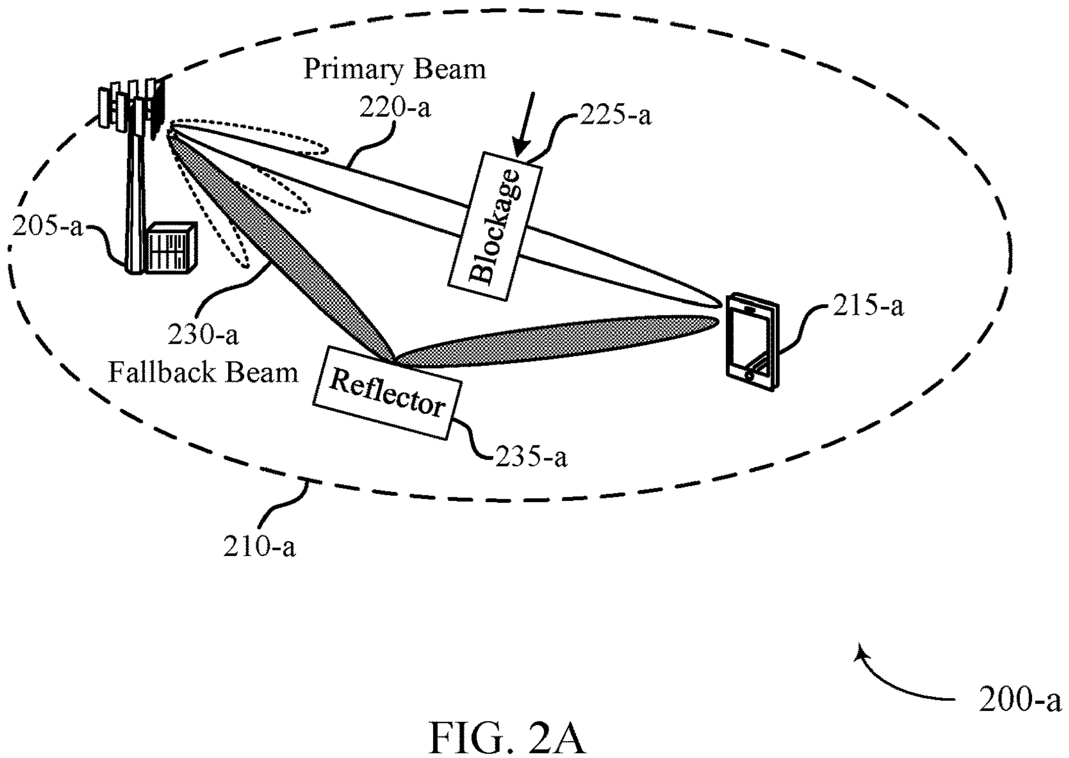
FIGS. 2A and 2B illustrate aspects of wireless communications subsystems that support switching to a fallback beam in accordance with various aspects of the various disclosure.

FIG. 2A illustrates aspects of a wireless communications subsystem that supports switching to a fallback beam in accordance with various aspects of the various disclosure. Wireless communications subsystem 200-*a* may include base station 205-*a*, which may be an example of a base station as described with reference to FIG. 1; and UE 215-*a*, which may be an example of a UE as described with reference to FIG. 1. Base station 205-*a* and UE 215-*a* may communicate with one another within coverage area 210-*a* using techniques described herein and with reference to FIG. 1.

As discussed herein, retransmissions of a data transmission that failed as a result of a blockage may similarly fail when the retransmission is transmitted over the same communication path as the initial transmission. To increase the reliability of retransmissions and to mitigate the effect of blockages, a memory system may transmit a retransmission over a different, spatially-diverse transmission beam than the transmission beam used to transmit a corresponding initial data transmission.

For example, base station 205-*a* may be configured to perform beamformed transmissions in multiple spatial directions. In some cases, the path of a beamformed transmission is referred to as a transmission beam. In some examples, base station performs a beamsweep procedure. During a beamsweep procedure, base station 205-*a* may transmit multiple beamformed transmissions in multiple directions—the path of the beamformed transmissions may include, but are not limited to, primary transmission beam 220-*a* and fallback transmission beam 230-*a*. In some cases, a beamformed transmission may reflect off other objects within coverage area 210-*a*, guiding a beamformed transmission that is initially transmitted in a direction away from a UE toward the UE (e.g., UE 215-*a*). For example, fallback transmission beam 230-*a* may be transmitted in a first direction away from UE 215-*a* but may reflect off of reflector 235-*a* such that fallback transmission beam 230-*a* reaches UE 215-*a*.

UE 215-*a* may receive all or a portion of the beamformed transmissions transmitted from base station 205-*a*. UE 215-*a* may report to base station 205-*a* CSI for each beamformed transmission received at UE 215-*a*. CSI may include channel quality information, a rank indication, and/or a precoding matrix indicator.

Base station 205-*a* may use the reported CSI to identify a subset of the beamformed transmissions that satisfy spatial diversity and/or channel quality thresholds. For instance, base station 205-*a* may identify that a signal transmitted over primary transmission beam 220-*a* and a signal transmitted over fallback transmission beam 230-*a* are received at UE 215-*a* with a signal-to-noise ratio that exceeds a first threshold. Base station 205-*a* may also identify that a spatial diversity between primary transmission beam 220-*a* and fallback transmission beam 230-*a* exceeds a second threshold. In some examples, base station 205-*a* may identify primary transmission beam 220-*a* as a candidate for initial data transmissions and fallback transmission beam 230-*a* for retransmissions after determining that primary transmission beam 220-*a* exhibits a higher channel quality than fallback transmission beam 230-*a*. By identifying a spatially-diverse transmission beam to fall back to when a primary transmission beam is blocked, wireless communications subsystem 200-*a* may adaptively perform communications around blockages that move into the path of a primary transmission beam after the primary transmission beam is configured between base station 205-*a* and UE 215-*a*.

After primary transmission beam 220-*a* and fallback transmission beam 230-*a* are identified, base station 205-*a* may transmit an indication to UE 215-*a* indicating that subsequent initial data transmissions will be transmitted over primary transmission beam 220-*a*. The indication may also indicate that subsequent retransmissions will be transmitted over fallback transmission beam 230-*a*. After receiving the indication of the primary transmission beam 220-*a*, UE 215-*a* may tune a primary receive beam to correspond to the primary transmission beam 220-*a* and may tune a fallback receive beam to correspond to the fallback transmission beam 230-*a*. That is, UE 215-*a* may configure antennas at UE 215-*a* in a first configuration to receive transmissions in the direction from which primary transmission beam 220-*a* is received and may configure the antennas at UE 215-*a* in a second configuration to receive transmission in the direction from which fallback transmission beam 230-*a* is received. In some cases, the antennas at UE 215-*a* may not be reconfigured to switch from a primary receive beam to a fallback receive beam—that is, UE 215-*a* may use a single antenna configuration and may not be configured to receive information over different receive beams. By indicating the primary and fallback transmission beams to a UE, a base station and UE may perform coordinated switching between the primary and fallback transmission beams without using additional signaling.

Base station 205-*a* may perform initial data transmissions to one or more UEs (including UE 215-*a*) over primary transmission beam 220-*a*. In some cases, base station 205-*a* schedules periodic resources in primary transmission beam 220-*a* for UEs using primary transmission beam 220-*a*. Thus, base station 205-*a* may transmit initial data transmissions without including control channel resources, and UEs, such as UE 215-*a*, may receive the initial data transmissions without decoding a control channel. By not including control channel resources, base station 205-*a* may include more data in initial data transmissions over primary transmission beam 220-*a*. Performing initial data transmissions over periodically scheduled resources is discussed in more detail herein and in FIG. 4.

In some cases, blockage 225-*a* may enter the path of primary transmission beam 220-*a*, degrading a transmission by base station 205-*a* over primary transmission beam 220-*a* before the transmission reaches UE 215-*a*. In some cases, blockage 225-*a* causes UE 215-*a* to fail to receive (e.g., in a scheduled interval) or decode the initial data transmission. After failing to receive or decode the transmission, UE 215-*a* may transmit a negative acknowledgment (NACK) message to base station 205-*a* indicating that UE 215-*a* failed to receive or decode the transmission. UE 215-*a* may also reconfigure, before or concurrently with transmitting the NACK message, its antennas so that a receive beam from UE 215-*a* corresponds with the incoming direction of fallback transmission beam 230-*a*.

After receiving the NACK message or receiving no feedback from UE 215-*a*, base station 205-*a* may reconfigure antennas (e.g., by assigning different weights to components of a transmission being performed over different antennas) at base station 205-*a* to perform transmissions over fallback transmission beam 230-*a*. Base station 205-*a* may then transmit the data from the failed transmission in a retransmission over fallback transmission beam 230-*a*. By performing the retransmission over fallback transmission beam 230-*a*, the retransmission may reach a location of UE 215-*a* without being impeded. Thus, UE 215-*a* may successfully receive and decode the data included in the retransmission.

In some cases, the retransmission includes control channel resources and data resources, where control information in the control channel resources indicate the location of the data resources for UEs (including UE 215-*a*) that failed to receive an initial data transmission over primary transmission beam 220-*a*. By using control channel resources, base station 205-*a* may dynamically retransmit data only for UEs that failed to indicate the successful reception of initial data transmission. Performing retransmissions of data using control channel scheduled data resources is discussed in more detail herein and in FIG. 4.

After successfully receiving and decoding the data, UE 215-*a* may transmit an acknowledgment (ACK) message to base station 205-*a*—e.g., using the same path as the fallback transmission beam 230-*a*—and may reconfigure the antennas at UE 215-*a* to form a receive beam from UE 215-*a* in the direction of primary transmission beam 220-*a*. Base station 205-*a* may similarly reconfigure the antennas at base station 205-*a* to form primary transmission beam 220-*a*—in some cases, base station 205-*a* reconfigures the antennas after sending the retransmission to UE 215-*a*. Base station 205-*a* may then resume transmissions to UEs (including UE 215-*a*) over primary transmission beam 220-*a*—e.g., according to periodically scheduled resources.

In some cases, blockage 225-*a* may leave the path of primary transmission beam 220-*a*, and base station 205-*a* may perform successful transmissions to UE 215-*a* over primary transmission beam 220-*a*. In other cases, blockage 225-*a* may remain in the path of primary transmission beam 220-*a*, and base station 205-*a* may continue to perform unsuccessful transmissions to UE 215-*a* over primary transmission beam 220-*a*. If blockage 225-*a* remains, base station 205-*a* and UE 215-*a* may again fall back to fallback transmission beam 230-*a*. In some cases, base station 205-*a* and UE 215-*a* repeat this process until blockage 225-*a* is removed from the path of primary transmission beam 220-*a*. In other cases, base station 205-*a* and UE 215-*a* identify a new primary transmission beam and a new fallback transmission beam, in accordance with the above techniques, after a threshold number of transmission failures over primary transmission beam 220-*a* occur.

Figure 2B:
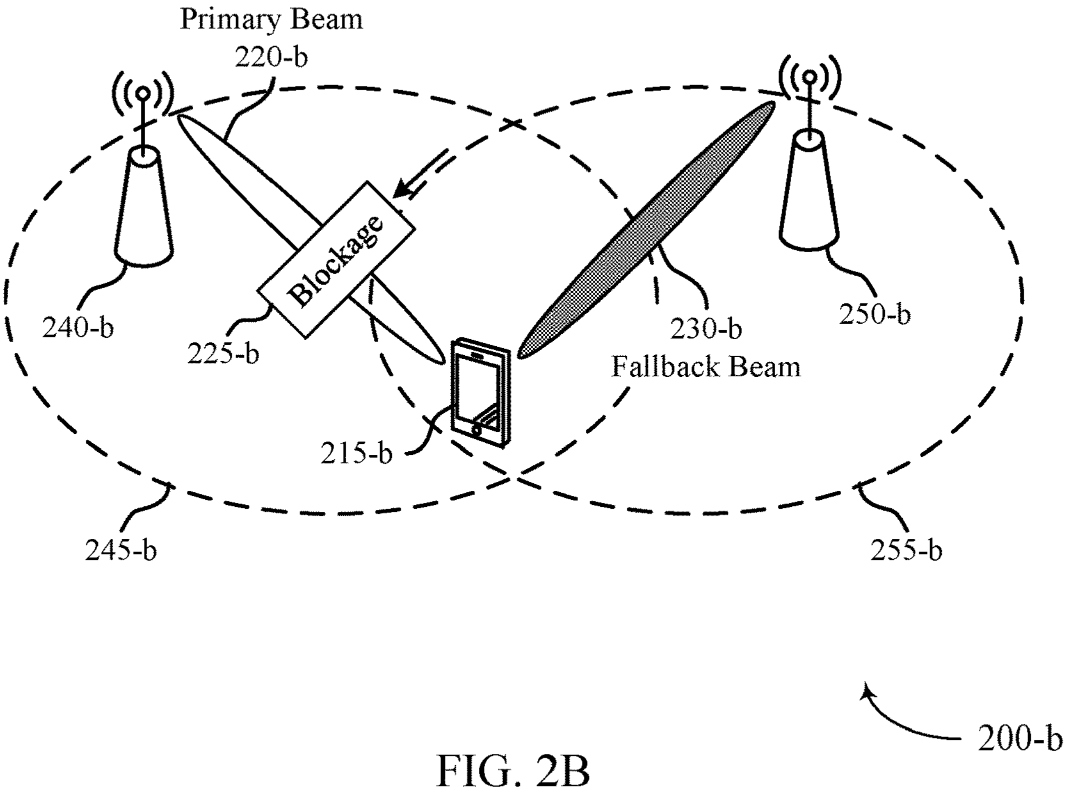

FIG. 2B illustrates aspects of a wireless communications subsystem that supports switching to a fallback beam in accordance with various aspects of the various disclosure. Wireless communications subsystem 200-*b* may include first TRP 240-*b* and second TRP 250-*b*, which may be examples of access network transmission entities as described with reference to FIG. 1; and UE 215-*b*, which may be an example of a UE 115 as described with reference to FIGS. 1 and 2. First TRP 240-*b* and second TRP 250-*b* may communicate with UE 215-*b* within first coverage area 245-*b* and second coverage area 255-*b* using techniques described herein and with reference to FIGS. 1 and 2A.

As discussed herein, to increase the reliability of retransmissions and to mitigate the effect of blockages, a memory system may transmit a retransmission over a transmission beam that originates from a different location than the transmission beam used to transmit a corresponding initial data transmission.

For example, a base station may be capable of transmitting data to a UE (e.g., UE 215-*b*) from different transmission points, including first TRP 240-*b* and second TRP 250-*b* that are physically separated from one another. In some cases, a transmission to UE 215-*b* from first TRP 240-*b* may be referred to as primary transmission beam 220-*b* and a transmission to UE 215-*b* from second TRP 250-*b* may be referred to as fallback transmission beam 230-*b*. During a beam sweeping procedure, UE 215-*b* may receive transmissions over transmission beams including primary transmission beam 220-*b* and fallback transmission beam 230-*b*. UE 215-*b* may report CSI for the transmissions received over the transmission beams to a base station that is communicatively connected to the different transmission points.

The base station may use the reported CSI to identify that transmissions over primary transmission beam 220-*b* and fallback transmission beam 230-*b* exceed a channel quality. The base station may also determine that primary transmission beam 220-*b* and fallback transmission beam 230-*b* exceed a spatial-diversity threshold based on determining that primary transmission beam 220-*b* and fallback transmission beam 230-*b* originate from different TRPs.

After primary transmission beam 220-*b* and fallback transmission beam 230-*b* are identified, the base station may transmit an indication to UE 215-*b*—e.g., via one of first TRP 240-*b* or second TRP 250-*b*—indicating that subsequent initial data transmissions will be transmitted over primary transmission beam 220-*b*. The indication may also indicate that subsequent retransmissions will be transmitted over fallback transmission beam 230-*b*.

First TRP 240-*b* may perform initial data transmission to UEs (including UE 215-*b*) over primary transmission beam 220-*b*. In some cases, first TRP 240-*b* schedules periodic resources for UE 215-*b* to receive the initial data transmission without decoding a control channel. Performing initial data transmissions over periodically scheduled resources is discussed in more detail herein and in FIG. 4.

In some cases, blockage 225-*b* may enter the path of primary transmission beam 220-*b*, degrading a transmission to UE 215-*b*. In some cases, blockage 225-*b* causes UE 215-*b* to fail to receive (e.g., in a scheduled interval) or decode an initial data transmission sent over primary transmission beam 220-*b*. After failing to receive or decode the initial data transmission, UE 215-*b* may transmit a NACK message to first TRP 240-*b* and reconfigure antennas at UE 215-*b* so that a receive beam from UE 215-*b* corresponds with the incoming direction of fallback transmission beam 230-*b*. In some cases, UE 215-*b* may refrain from reconfiguring the antennas at UE 215-*b* after transmitting the NACK message—e.g., UE 215-*b* may use a single antenna configuration, or may not use directional antenna configurations, to receive transmissions.

After receiving the NACK message or no feedback from UE 215-*b* at first TRP 240-*b*, the base station may route retransmissions of the initial data to second TRP 250-*b*. Accordingly, second TRP 250-*b* may perform retransmissions of initial data that was not verified as being successfully received at designated UEs (including UE 215-*b*) over fallback transmission beam 230-*b*. In some cases, the retransmissions may include control channel resources that include control information scheduling data resources for designated UEs in corresponding data channel resources. Performing retransmissions of data using control channel scheduled data resources is discussed in more detail herein and in FIG. 4. By performing retransmission over a different TRP, a base station may achieve spatial diversity between transmissions and retransmission, mitigating the effects of blockages that enter a primary transmission path.

In some cases, UE 215-*b* successfully receives and decodes the retransmission over fallback transmission beam 230-*b* (e.g., because there is no blockage between second TRP 250-*b* and UE 215-*b*). After successfully decoding the retransmission, UE 215-*b* may transmit an ACK message to second TRP 250-*b* and may reconfigure the antennas at UE 215-*b* to form a receive beam in the direction of primary transmission beam 220-*b*. In some cases, first TRP 240-*b* and UE 215-*b* successfully communicate data after UE 215-*b* returns to primary transmission beam—e.g., if blockage 225-*b* leaves the path of primary transmission beam 220-*b*. In other cases, transmissions between first TRP 240-*b* and UE 215-*b* continue to fail—e.g., due to the continued presence of blockage 225-*b* in the path of primary transmission beam 220-*b*. In some examples, the base station identifies a new primary and/or secondary transmission beam based on a number of transmission failures over primary transmission beam 220-*b* exceeding a threshold value in accordance with the above techniques.

Figure 3:
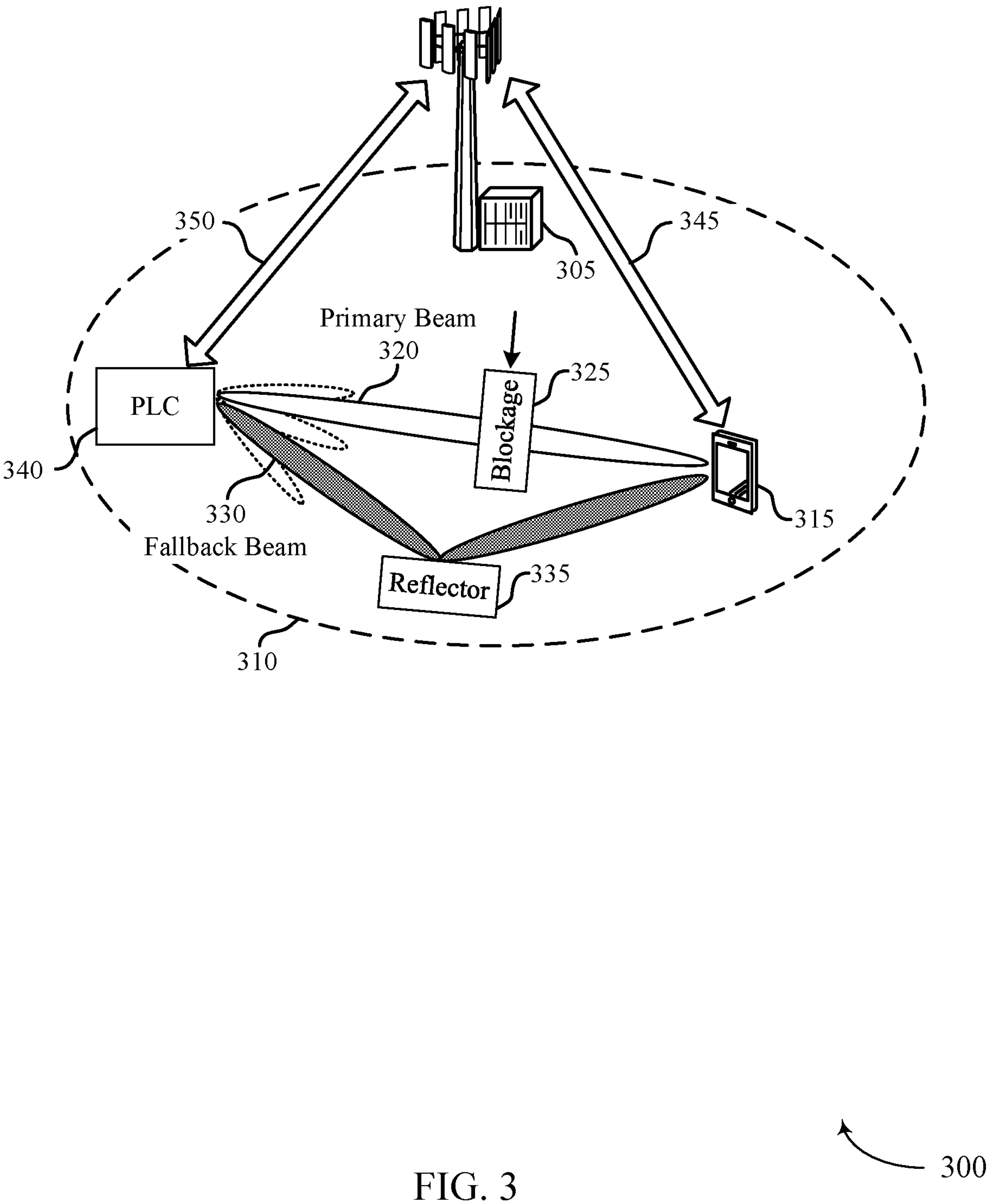
FIG. 3 illustrates aspects of a wireless communications subsystem that supports switching to a fallback beam in accordance with various aspects of the various disclosure.

FIG. 3 illustrates aspects of a wireless communications subsystem that supports switching to a fallback beam in accordance with various aspects of the various disclosure. Wireless communications subsystem 300 may include base station 305, which may be an example of a base station as described with reference to FIGS. 1 and 3; and UE 315, which may be an example of a UE as described with reference to FIGS. 1, 2A, and 2B. Base station 305 and UE 315 may communicate with one another within coverage area 310 using techniques described herein and with reference to FIGS. 1, 2A, and 2B.

Wireless communications subsystem 300 may also include PLC 340 which may communicate with base station 305 and may be configured to communicate directly with UE 315. Direct communications between PLC 340 and UE 315 may be referred to as sidelink communications. In some cases, PLC 340 may schedule communications between PLC 340 and UE 315. In other cases, base station 305 may schedule communications between PLC 340 and UE 315.

As discussed herein, retransmissions of a data transmission that failed as a result of a blockage may similarly fail when the retransmission is transmitted over the same communication path as the initial transmission. To increase the reliability of retransmissions and to mitigate the effect of blockages, a memory system may transmit a retransmission over a different, spatially-diverse transmission beam than the transmission beam used to transmit a corresponding initial data transmission.

For example, PLC 340 may be configured to perform beamformed transmissions in multiple spatial directions. In some cases, PLC 340 performs a beamsweep procedure that includes performing beamformed transmissions over primary transmission beam 320 and fallback transmission beam 330. In some examples, fallback transmission beam 330 reflects off of reflector 335, and fallback transmission beam 330 is guided toward UE 315.

UE 315 may report CSI for each beamformed transmission received at UE 315. In some cases, UE 315 reports CSI directly to PLC 340. When UE 315 reports CSI directly to PLC 340, PLC 340 may identify and perform communications over primary transmission beam 320 and fallback transmission beam 330 as discussed with reference to FIG. 2A.

In other cases, UE 315 reports CSI to base station 305 over first communication link 345. First communication link 345 may be configured to use beamformed communications. Base station 305 may process the received CSI to identify primary transmission beam 320 and fallback transmission beam 330. For examples, base station 305 may determine that primary transmission beam 320 and fallback transmission beam 330 both exceed a channel quality threshold. Additionally, base station 305 may determine that a spatial-diversity between primary transmission beam 320 and fallback transmission beam 330 exceed a spatial diversity threshold.

After primary transmission beam 320 and fallback transmission beam 330 are identified, base station 305 may transmit an indication to both PLC 340 and UE 315 indicating that subsequent sidelink communications are to use primary transmission beam 320 for initial data transmissions. The indication may also indicate that fallback transmission beam 330 for retransmissions of failed initial data transmissions. In some cases, base station 305 indicates primary transmission beam 320 and fallback transmission beam 330 to PLC 340 over second communication link 350, which may be configured to use beamformed communications.

PLC 340 may perform initial data transmission to UE 315 over primary transmission beam 320. In some cases, PLC 340 schedules periodic resources for UE 315 in primary transmission beam 320 for initial data transmissions. In other cases, base station 305 schedules resources for PLC 340 and UE 315 to perform initial data transmission over primary transmission beam 320. Performing initial data transmissions over periodically scheduled resources is discussed in more detail herein and in FIG. 4. In other cases, PLC 340 performs initial data transmissions to UE 315 over primary transmission beam using control channel scheduled data transmissions.

In some cases, blockage 325 may enter the path of primary transmission beam 320 and UE 315 may fail to receive or decode an initial data transmission from PLC 340. Accordingly, UE 315 may transmit a NACK message to PLC 340—e.g., over primary transmission beam 320. UE 315 may also reconfigure its antennas to form a receive beam in the direction of fallback transmission beam 330 based on failing to receive or decode the initial data transmission. In some cases, UE 315 may not reconfigure its antennas to form a receive beam—e.g., UE 315 may not be configured to use directionally receive transmissions.

After receiving the NACK message or no feedback from UE 315, PLC 340 may also reconfigure its antennas to form fallback transmission beam. PLC 340 may then perform retransmissions of the data include in the failed initial transmission over fallback transmission beam 330.

In some cases, UE 315 receives and decodes the retransmission over fallback transmission beam 330—e.g., due to the lack of blockages in the path of fallback transmission beam 330. After successfully decoding the retransmission, UE 315 may transmit an ACK message to PLC 340—e.g., using the same communication path as fallback transmission beam 330—and may reconfigure antennas at UE 315 to form a receive beam in the direction of primary transmission beam 320. PLC 340 may similarly reconfigure antennas to form primary transmission beam 320 and PLC and UE 315 may resume initial data communications over primary transmission beam 320.

In some cases, blockage 325 may leave the path of primary transmission beam 320, and subsequent initial data transmission may be successfully communicated between PLC 340 and UE 315 over primary transmission beam 320. In other cases, blockage 325 may remain in the path of primary transmission beam 320, and PLC 340 and UE 315 may similarly fall back to fallback transmission beam 330. In some cases, PLC 340 may trigger itself, or be triggered by base station 305, to perform an additional beamsweep procedure. If PLC 340 performs the beamsweep procedure on its own, PLC 340 may indicate to base station 305 that a beamsweep procedure has been performed. After PLC 340 performs the beamsweep procedure, UE 315 may report CSI to base station 305, and base station 305 may identify a new primary and fallback transmission beam. Base station 305 may then indicate the new primary and fallback transmission beam to PLC 340 and UE 315—e.g., over first communication link 345 and second communication link 350.

Figure 4:
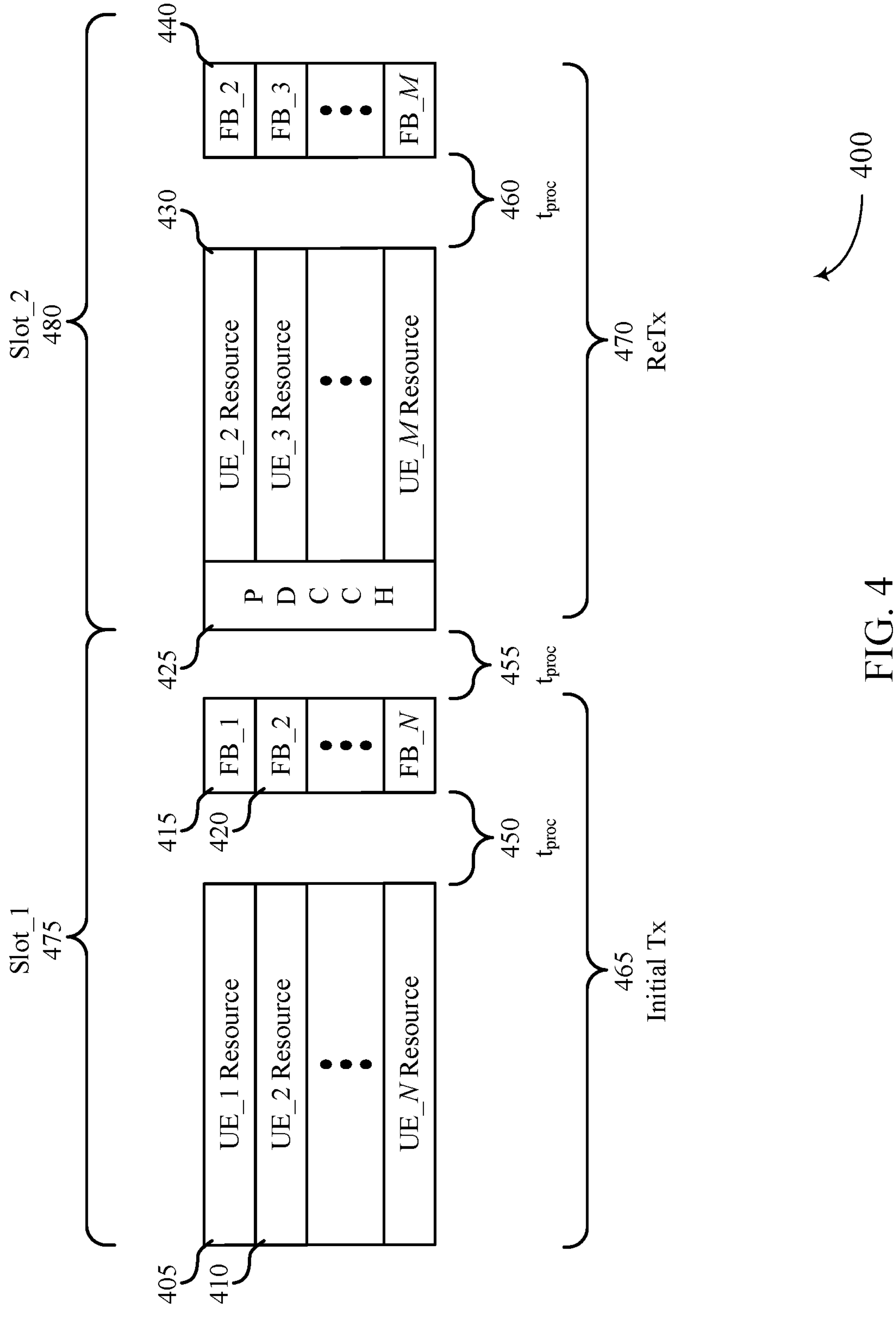
FIG. 4 illustrates aspects of exemplary communication resources that support switching to a fallback beam in accordance with various aspects of the various disclosure.

FIG. 4 illustrates aspects of exemplary communication resources that support switching to a fallback beam in accordance with various aspects of the various disclosure. Communication resources 400 may include downlink data resources (e.g., first UE resource 405 and second UE resource 410); a first set of uplink feedback resources (e.g., first feedback resource 415 and second feedback resource 420); control channel resources 425; data channel resources (e.g., data channel resource 430); and a second set of uplink feedback resources (e.g., third feedback resource 440). In some cases, control information in control channel resources 425 may be used to schedule data channel resources for a receiving device.

In some cases, the downlink data resources may be separated from the first set of uplink feedback resources by first processing time 450. In some cases, first processing time 450 includes time for a receiving device to perform an action and to take sensor measurements. The first set of uplink resources may be separated from the control channel resources 425 by a second processing time 455. Second processing time 455 may include time for a transmitting device to determine whether initial data transmission over the downlink data resources were successfully received and to process received measurements. The data channel resources may be separated from the second set of uplink feedback resources by a third processing time 460. Third processing time may include time for a receiving device to perform an action and to take sensor measurements.

In some cases, initial transmission 465 includes the downlink data resources and the first set of uplink feedback. Initial transmission 465 may be transmitted within first slot 475. First slot 475 may extend 0.5 ms. In some cases, initial transmission 465 is transmitted over a first transmission beam.

Retransmission 470 may include control channel resources 425, the data channel resources, and the second set of uplink feedback resources. Retransmission 470 may be transmitted within second slot 480, which may also extend 0.5 ms. In some cases, retransmission 470 includes data for UEs that was initially transmitted in initial transmission 465 but failed—e.g., due to a blockage. In some cases, retransmission 470 is transmitted over a second transmission beam. In some cases, first slot 475 and second slot 480 may make up a subframe.

In some examples, a first UE is scheduled to receive initial data transmissions over periodically scheduled data resources, including first UE resource 405. Thus, the first UE may receive, or expect to receive, an initial data transmission over first UE resource 405. A second UE may similarly receive, or expect to receive, an initial data transmission over second UE resource 410. As discussed herein, a blockage may prevent the second UE from receiving and/or decoding a transmitted initial data transmission over second UE resource 410—e.g., due to a blockage entering a path of a first transmission beam containing second UE resource 410.

After the end of downlink data resources, the first and second UE may process and decode any received signals during first processing time 450. In some examples, the first UE may successfully decode the data transmission and may perform an action based on the data. The first UE may also take sensor measurements and prepare an ACK message for transmission to the transmitting device. In some examples, the second UE may fail to receive or decode a signal received during second UE resource 410 and may take sensor measurements and/or prepare a NACK message for transmission to the transmitting device.

After first processing time 450 ends, the first UE may transmit its generated information over first feedback resource 415, and the second UE may transmit its generated information over second feedback resource 420. In some cases, the uplink feedback reaches the transmitting device. In other cases, the uplink feedback fails to reach the transmitting device—e.g., the uplink feedback transmitted by the second UE may be similarly blocked from reaching the transmitting device.

The transmitting device may process any feedback during second processing time 455. In some cases, the transmitting device may fail to receive an ACK message from the first UE and a NACK message, or fail to receive or decode any feedback, from the second UE. After processing the feedback from the UEs, the transmitting device may prepare a control channel scheduled transmission that includes control channel resources 425 and corresponding data channel resources.

After second processing time 455 ends, the transmitting device may retransmit data from the initial transmission that was not verified as being successfully received. As discussed above, the retransmission may include control channel resources 425 to schedule data transmissions during corresponding data channel resources. Also, the retransmission may be transmitted over a second transmission beam. The second UE may receive control channel resources 425—e.g., because the retransmission is transmitted over a fallback transmission beam—and determine that control information for the second UE is included in the control channel resources 425—e.g., based on a blind decoding procedure. The second UE may then identify that data channel resource 430 are conveying a retransmission of data for the second UE that was initially transmitted in initial transmission 465. The second UE may then successfully receive and decode the data over data channel resource 430. In some cases, data channel resource 430 uses a same number of resources as second UE resource 410. The first UE may similarly receive control channel resources 425 but may determine that no data channel resources are scheduled for the first UE.

At the end of the data channel resources, the second UE may process the data during third processing time 460 and take any indicated actions. The second UE may also generate feedback information to transmit to the transmitting device, including an ACK message and sensor measurements during third processing time 460. After third processing time 460 ends, the second UE may transmit the ACK message to the transmitting device over third feedback resource.

The depicted communication resource structure may be repeated in prior and subsequent and subframes, where initial transmissions may be transmitted over a first transmission beam during periodically scheduled resources, and retransmissions may be transmitted over a second transmission beam during dynamically scheduled resources (e.g., control channel scheduled resources).

Figure 5:
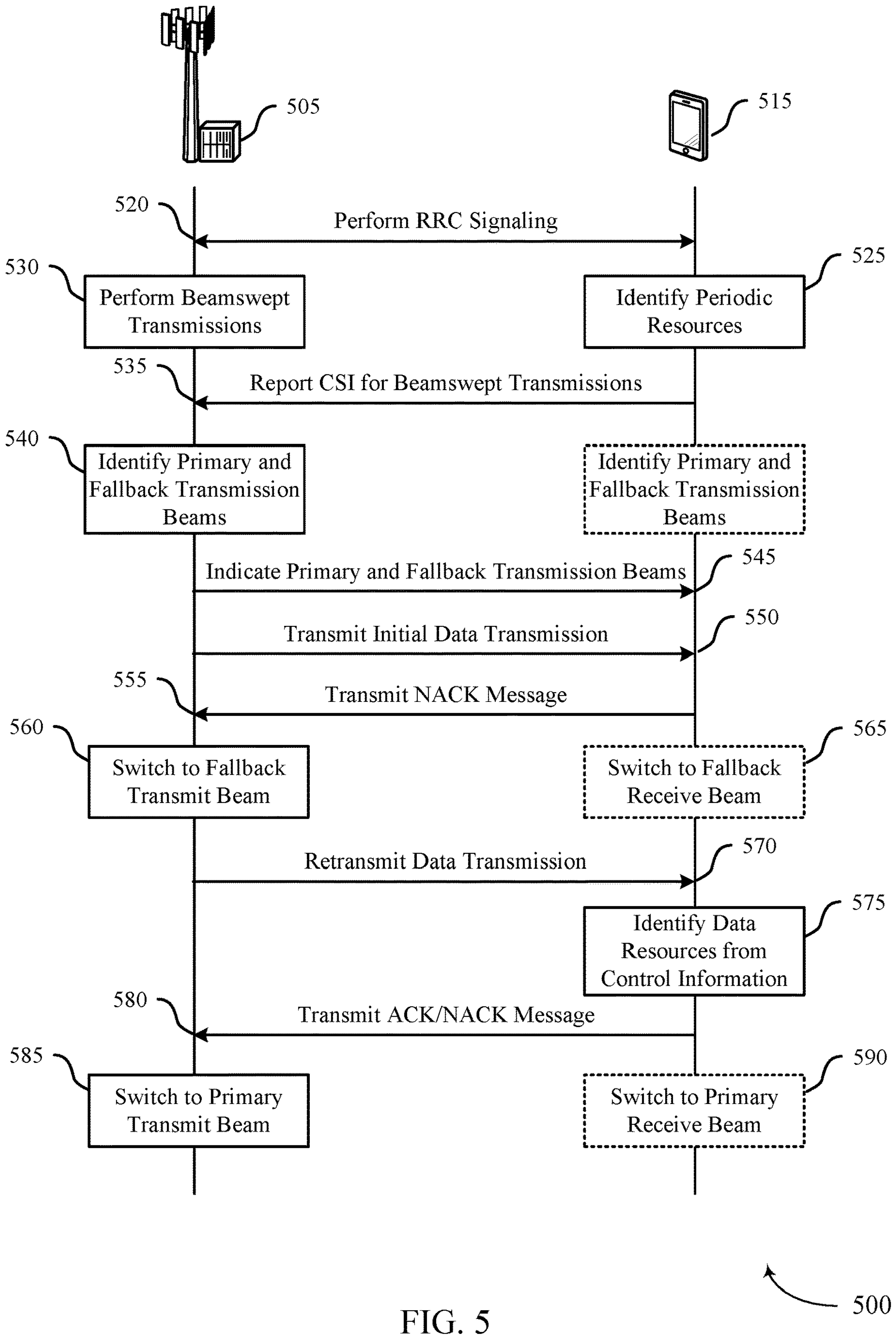
FIG. 5 illustrates aspects of a process for switching to a fallback beam in accordance with various aspects of the various disclosure.

FIG. 5 illustrates aspects of a process for switching to a fallback beam in accordance with various aspects of the various disclosure. Process flow 500 may be performed by base station 505, which may be an example of a base station as discussed with reference to FIGS. 1 through 3; and UE 515, which may be an example of a UE as described above with reference to FIGS. 1 through 3.

In some examples, base station 505 and UE 515 may perform coordinated fallback procedures from a primary beam to a fallback beam. In some cases, base station 505 is a gNB, a gNB that includes multiple transmission points, a gNB that is coupled with a PLC, or a standalone PLC. In some cases, UE 515 is a PLC or a S/A device.

At arrow 520, base station 505 and UE 515 may perform RRC signaling. In some cases, UE 515 may indicate a capability to receive beamformed transmission from multiple directions. In some cases, base station 505 may indicate to UE 515 downlink resources that are periodically scheduled for UE 515 to receive initial data transmissions. In some cases, base station 505 and UE 515 may use RRC signaling to configure URLLC between base station 505 and UE 515—e.g., if base station 505 and UE 515 are operating in a factory setting (e.g., a manufacturing facility). In some cases, the RRC signaling may be used to configure UE 515 to receive and report CSI for multiple transmission beamformed transmissions that are transmitted by base station 505.

At block 525, UE 515 may identify periodic downlink resources that are scheduled for initial data transmissions to UE 515. Accordingly, UE 515 may receive initial data transmissions during the scheduled intervals without first decoding a control channel.

At block 530, base station 505 may transmit multiple beamformed transmissions in multiple directions. In some cases, beamformed transmissions from base station 505 that initially travel in a direction away from UE 515 may be redirected toward UE 515—e.g., after reflecting off an object. In some cases, base station 505 may transmit beamformed transmissions from multiple transmission points that are physically separated from one another. UE 515 may receive all or a portion of the beamformed transmissions transmitted from base station 505.

At arrow 535, UE 515 may transmit CSI for each of the received beamswept transmissions from base station 505. In some cases, the CSI includes channel quality information, a rank indicator, and/or a precoding matrix. And base station 505 may receive the CSI from UE 515.

At block 540, base station 505 may identify a primary and fallback transmission beam for transmission to UE 515 based on the reported CSI. In some cases, the primary transmission beam is reserved for initial data transmissions to UE 515 during the periodically scheduled intervals. And the fallback transmission beam is reserved for retransmission of the data included in the initial data transmission during data resources (e.g., physical downlink shared channel (PDSCH) resources) scheduled by control channel (e.g., physical downlink control channel (PDCCH)) signaling.

To identify the primary and fallback transmission beam, base station 505 may perform calculations based on the transmitted transmission beams and the CSI received from UE 515. For example, base station 505 may identify the spatial diversity between each of the transmission beams and may identify transmission beams having a spatial diversity that exceeds a threshold value. In some examples, the spatial diversity between transmission beams is identified by measuring an angular difference between the initial directions of the transmission beams. In some examples, the spatial diversity between transmission beams is identified by determining that the transmission beams originate from different transmission points. In some examples, base station 505 selects transmission beams that are maximally uncoordinated as the primary and fallback transmission beams.

Base station 505 may also identify the channel quality of each of the transmission beams based on the reported CSI. Base station 505 may then select two or more transmission beams from the available transmission beams that satisfy spatial diversity and channel quality thresholds. In some cases, UE 515 also identifies the primary and fallback transmission beam by performing the same or similar calculations as base station 505.

At arrow 545, base station 505 may indicate to UE the primary and fallback transmission beams selected by base station 505. Base station 505 may then configure its antennas to perform transmissions in the direction of the primary transmission beam. UE 515 may receive the indication of the primary and fallback transmission beams and may configure its antennas to receive transmission coming from the direction of the primary transmission beam. In some cases, UE 115 may also configure its antennas to transmit uplink transmissions in the direction of the primary transmission beam. In some cases, instead of indicating the periodically scheduled resources in RRC signaling, base station 505 may indicate the periodically scheduled resources for UE 515 at arrow 545.

In some examples, base station 505 indicates to UE 515 both the primary and fallback transmission beams in a control message (e.g., a downlink grant, dynamic grant, configured grant, uplink grant, etc.). In some examples, the control message includes a field for indicating the primary transmission beam for the scheduled initial transmission and another field for indicating the fallback transmission beam for a subsequent retransmission that may occur. In other examples, base station 505 indicates the primary transmission beam and a table for determining the second transmission beam to UE 515. The table may include mappings between indicated primary transmission beams and fallback transmission beams e.g., the table may indicate that a fallback transmission beam is to be used for retransmission when a primary transmission beam is indicated. Base station 505 may generate the table based on the CSI reported by UE 515. Base station 505 may indicate (e.g., semi-statically) the table to UE 515 in higher-layer control signaling (e.g., RRC or MAC layer signaling). Base station 505 may also indicate (e.g., dynamically) the primary transmission beam to UE 515 in physical layer control signaling (e.g., downlink control information (DCI) or other PDCCH signaling).

In some examples, the table is indicated on a semi-static basis, and thus, UE 515 may store and consult the table until a new table is received (if applicable) from base station 505. In such cases, after receiving an indication of a primary transmission beam, UE 515 may consult an entry in the table for the primary transmission beam that corresponds to a fallback transmission beam. UE 515 may then determine that the primary transmission beam is configured for initial transmission and the fallback transmission beam is configured for retransmissions. UE 515 may subsequently (e.g., after the operations described at block 590) receive additional indications of primary transmission beams from base station 505 and may determine different fallback transmission beams based on an indicated primary transmission beam and the table.

At arrow 550, base station 505 may transmit an initial data transmission over the primary transmission beam during a scheduled interval. In some cases, a blockage may be located in the path of the primary transmission beam, and UE 515 may fail to receive the initial data transmission during the scheduled interval or may fail to decode the initial data transmission after receipt.

At arrow 555, UE 515 may transmit a NACK message to base station 505 based on failing to receive or decode the initial data transmission during scheduled resources. Base station 605 may receive and decode the NACK message from UE 515 and determine that the initial data transmission failed. In some cases, base station 505 does not receive or fails to decode the NACK message—e.g., if the NACK message is transmitted using the same path as the primary transmission beam.

At block 560, base station 505 switches from the primary transmission beam to the fallback transmission beam. To switch between the primary and fallback transmission beam, base station 505 may reconfigure its antennas to form the fallback transmission beam.

At block 565, UE 515 may switch from a primary receive beam corresponding to the primary transmission beam to a fallback receive beam corresponding to the primary transmission beam. To switch between the primary and fallback receive beam, UE 515 may reconfigure its antennas to form the fallback receive beam. UE 515 may switch from the primary receive beam to the fallback receive beam any time after failing to receive the initial data transmission—e.g., before transmitting the NACK message. In some cases, UE 515 may also reconfigure its antennas to form a fallback uplink transmission beam in the direction of the fallback transmission beam. In other cases, UE 515 may not switch to fallback receive beam—e.g., UE 515 may use a single antenna configuration to receive transmissions from base station 505.

At arrow 570, base station 505 retransmits the data that was included in the failed initial data transmission over the fallback transmission beam. In some cases, base station 505 retransmits the data in control channel scheduled data resources. UE 515 may receive the fallback transmission over the fallback receive beam and may successfully decode the retransmission—e.g., due to the absence of blockages.

At block 575, UE 515 analyzes control channel resources in the retransmission to determine whether a data transmission has been scheduled for UE 515 in corresponding data channel resources. In some examples, UE 515 identifies its control channel resources based on a blind decoding process and corresponding data channel resources based on control information included in the identified control channel resources. After identifying its data channel resources, UE 515 may decode a signal transmitted over the data channel resources to obtain the transmitted data. In some cases, UE 515 performs an action based on decoding the data—e.g., UE 515 may actuate a motor and/or take sensor measurements.

At arrow 580, UE 515 transmits a feedback message to base station 505. If UE 515 successfully decodes the data received in the retransmission, UE 515 may transmit an ACK message to base station 505 along with measurement information. If UE 515 fails to decode the data received in the retransmission, UE 515 may transmit a NACK message to base station 505. In some cases, UE 515 transmits the feedback message over different resources than UE 515 transmit the feedback message to the initial data transmission—e.g., UE 515 may transmit the feedback message over different frequency resources or over a fallback uplink transmission beam that corresponds to the direction of the fallback transmission beam.

At block 585, base station 505 may switch back to the primary transmission beam before performing a subsequent initial data transmission. Concurrently at block 590, UE 515 may switch back to the primary receive beam before a periodically scheduled resource occurs. In other cases, UE 515 may not return to primary receive beam—e.g., UE 515 may use a single antenna configuration to receive transmissions from base station 505.

Accordingly, base station 505 and UE 515 may repeat the operations described starting with arrow 545. In some cases, base station 505 and UE 515 may successfully perform initial data transmissions after switching back to the primary transmission beam e.g., if a blockage in the path of primary transmission beam has been removed. In other cases, subsequent initial data transmissions between base station 505 and UE 515 may continue to fail, and base station 505 and UE 515 may continue to fall back to their respective fallback beams for retransmissions of the data, as discussed above. In some cases, base station 505 may be triggered to perform another beam sweeping procedure after a threshold number of transmission failures over the primary transmission beam occur within a designated interval e.g., if the blockage does not move. After performing the additional beam sweeping procedure, base station 505 may identify a new primary and secondary transmission beam for transmissions to UE 515, as discussed above.

In an alternative example, the initial data transmission to UE 515 may be successful, but base station 505 may fail to receive a corresponding ACK message from UE 515. In some cases, UE 515 may always switch to the fallback receive beam after sending feedback information, and thus, may receive the retransmission from base station 505. In other cases, base station 505 may switch to the fallback transmission beam while UE 515 may not switch to the fallback receive beam, reducing power consumption at UE 515. In such cases, UE 515 may not receive the retransmission from base station 505.

Although the above operations are discussed in the context of transmissions from base station 505 to UE 515, similar operations may be performed to support transmissions from UE 515 to base station 505. That is, UE 515 may be configured to perform uplink transmissions over (in the direction of) the primary and second fallback transmission beams identified by base station 505. And base station 505 may be similarly configured to receive initial uplink transmission over the primary transmission beam, report acknowledgment feedback for the uplink transmissions, and receiving uplink retransmissions over the fallback transmission beam.

Figure 6:
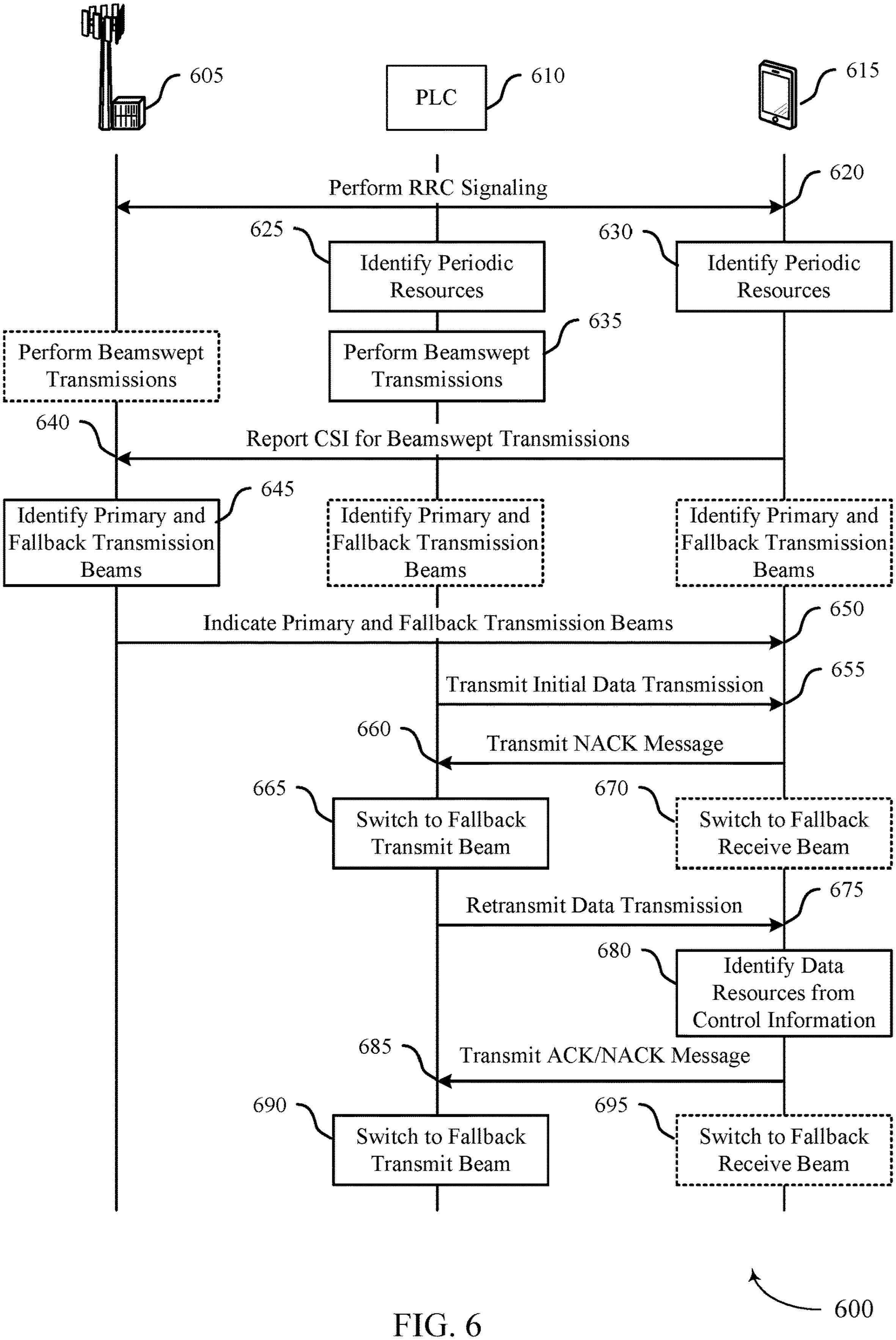
FIG. 6 illustrates aspects of a process for switching to a fallback beam in accordance with various aspects of the various disclosure.

FIG. 6 illustrates aspects of a process for switching to a fallback beam in accordance with various aspects of the various disclosure. Process flow 600 may be performed by base station 505, which may be an example of base station as discussed with reference to FIGS. 1 through 3 and 5; PLC 610, which may be an example of a PLC as described above with reference to FIGS. 1 and 3; and UE 515, which may be an example of a UE as described above with reference to FIGS. 1 through 3 and 5.

In some examples, PLC 610 and UE 615 may perform coordinated fallback procedures from a primary beam to a fallback beam during direct transmissions between PLC 610 and UE 615. In some cases, PLC 610 may rely on base station 605 to perform administrative tasks such as scheduling resources and performing backend calculations. In such cases, base station 605 may coordinate fallback procedures for PLC 610 and UE 615. In some cases, UE 515 is an S/A device.

At arrow 620, base station 605, PLC 610, and UE 615 may exchange RRC messages. In some cases, PLC 610 and UE 615 indicate to base station 605 a capability to communicate using beamformed transmissions and/or to directly communicate with another UE over a D2D communication link (also referred to as sidelink communications). PLC 610 and UE 615 may also indicate to base station 605 a capability to use URLLC technology. Base station 605 may indicate to PLC 610 and UE 615 that URLLC techniques are to be used for subsequent communications—e.g., if PLC 610 and UE 615 are operating in a manufacturing facility. In some cases, base station 605 may also indicate periodic resources for PLC 610 and UE 615 to communicate initial data transmissions between one another.

At block 625, PLC 610 may identify periodic resources for performing initial data transmissions to UE 615. Accordingly, PLC 610 may perform initial data transmissions without also using control channel resources to schedule the initial data transmissions.

At block 630, UE 615 may identify the periodic resources for receiving initial data transmissions from PLC 610. Accordingly, UE 615 may receive initial data transmissions during the scheduled intervals without first decoding a control channel.

At block 635, PLC 610 may transmit multiple beamformed transmissions in multiple directions. In some cases, beamformed transmissions from PLC 610 that initially travel in a direction away from UE 615 may be redirected toward UE 615. UE 615 may receive all or a portion of the beamformed transmissions transmitted from PLC 610. Additionally, or alternatively, base station 605 may perform beamswept transmissions. In such a case, both PLC 610 and UE 615 may receive all or a portion of the beamformed transmissions transmitted from base station 605.

At arrow 640, UE 615 may report, to base station 605, CSI for any of the beamformed transmissions from PLC 610 that were received. In cases, where base station 605 transmits beamformed transmissions, both UE 615 and PLC 610 may transmit CSI for any of the respective beamformed transmissions received.

At block 645, base station 605 may identify a primary and fallback transmission beam for sidelink transmissions between PLC 610 and UE 615 based on the reported CSI. In some cases, the primary transmission beam is reserved for initial data transmissions to UE 615 from PLC 610 during periodically scheduled intervals. And the fallback transmission beam is reserved for retransmission of failed data included in the initial data transmission during control channel (e.g., sidelink control channel (SDCCH) resource) scheduled data resources (e.g., sidelink share channel (SDSCH) resources).

To identify the primary and fallback transmission beam, base station 505 may perform calculations based on the transmitted transmissions beams and the CSI received from UE 615 and/or PLC 610, as similarly discuss at block 540 of FIG. 5. For example, base station 605 may identify the spatial diversity between the beamformed transmissions and select two or more transmission beams that satisfy spatial diversity requirements. Base station 605 may also identify the channel quality of each of the transmission beams based on the reported CSI and identify the transmission beams that satisfy the channel quality threshold. Base station 605 may use both computed spatial diversity values and channel quality information to select two or more transmission beams from the available set of transmission beams that satisfy spatial diversity and channel quality thresholds. In some cases, PLC 610 and UE 615 may also identify the primary and fallback transmission beam by performing the same or similar calculations as base station 505.

At arrow 650, base station 605 may indicate to PLC 610 and UE 615 the primary and fallback transmission beams selected by base station 605 for sidelink communications between PLC 610 and UE 615. PLC 610 may receive the indication of the primary and fallback transmission beam and configure its antennas to transmit sidelink communications in the direction of the primary transmission beam. Similarly, UE 615 may receive the indication of the primary and fallback transmission beam and configure its antennas to receive sidelink transmissions from the direction of the primary transmission beam. In some cases, PLC 610 may also configure its antennas to receive uplink sidelink transmissions, and UE 615 may also configure its antennas to transmit uplink sidelink transmissions, in the direction of the primary transmission beam. In some cases, instead of indicating the periodically scheduled resources in RRC signaling, base station 605 may indicate the periodically scheduled resources for PLC 610 and UE 615 at arrow 650.

In some examples, base station 605 indicates to PLC 610 and/or UE 615 both the primary and fallback transmission beams in a control message (e.g., a downlink grant, dynamic grant, configured grant, uplink grant, etc.). In some examples, the control message includes a field for indicating the primary transmission beam for the scheduled initial transmission and another field for indicating the fallback transmission beam for a subsequent retransmission that may occur. In other examples, base station 605 indicates the primary transmission beam and a table for determining the second transmission beam to PLC 610 and/or UE 615. The table may include mappings between indicated primary transmission beams and fallback transmission beams—e.g., the table may indicate that a fallback transmission beam is to be used for retransmission when a primary transmission beam is indicated. Base station 605 and/or PLC 610 may generate the table based on the CSI reported by UE 615. Base station 605 may indicate (e.g., semi-statically) the table to PLC 610 and/or UE 615 in higher-layer control signaling (e.g., RRC or MAC layer signaling). In some examples, PLC 610 indicates the table to UE 615 using higher-layer control signaling. Base station 605 may also indicate (e.g., dynamically) the primary transmission beam to PLC 610 and/or UE 615 in physical layer control signaling (e.g., DCI or other PDCCH signaling). In some examples, PLC 610 indicates the primary transmission beam to UE 615 using physical layer control signaling.

In some examples, the table is indicated on a semi-static basis, and thus, PLC 610 and/or UE 615 may store and consult the table until a new table is received (if applicable) from base station 605. In such cases, after receiving an indication of a primary transmission beam, PLC 610 and/or UE 615 may consult an entry in the table for the primary transmission beam that corresponds to a fallback transmission beam. PLC 610 and/or UE 615 may then determine that the primary transmission beam is configured for initial transmission and the fallback transmission beam is configured for retransmissions. UE 615 may subsequently (e.g., after the operations described at block 695) receive additional indications of primary transmission beams from base station 605 and may determine different fallback transmission beams based on an indicated primary transmission beam and the table.

At arrow 655, PLC 610 may transmit an initial sidelink data transmission over the primary transmission beam. In some cases, a blockage may be located in the path of the primary transmission beam, and UE 615 may fail to receive the initial data transmission during the scheduled interval or may fail to decode the initial data transmission after receipt.

At arrow 660, UE 615 may transmit a NACK message to PLC 610 based on failing to receive or decode the initial data transmission during scheduled resources. PLC 610 may receive and decode the NACK message from UE 615 and determine that the initial data transmission failed. In some cases, PLC 610 does not receive or fails to decode the NACK message—e.g., if the NACK message is transmitted using the same path as the primary transmission beam.

At block 665, PLC 610 switches from the primary transmission beam to the fallback transmission beam. To switch between the primary and fallback transmission beam, PLC 610 may reconfigure its antennas to form the fallback transmission beam. In some cases, PLC 610 also reconfigures its antennas to form a fallback uplink receive beam that corresponds with a fallback uplink transmission beam formed by the antennas at UE 615.

At block 670, UE 615 may switch from a primary receive beam corresponding to the primary transmission beam to a fallback receive beam corresponding to the primary transmission beam. To switch between the primary and fallback receive beam, UE 615 may reconfigure its antennas to form the fallback receive beam. UE 615 may switch from the primary receive beam to the fallback receive beam any time after failing to receive the initial data transmission—e.g., before transmitting the NACK message. In some cases, UE 615 reconfigures its antennas to form a fallback uplink transmission beam in the direction of the fallback transmission beam. In other cases, UE 515 may not switch to fallback receive beam e.g., UE 515 may use a single antenna configuration to receive transmissions from base station 505.

At arrow 675, PLC 610 retransmits the data that was included in the failed initial data transmission over the fallback transmission beam. In some cases, PLC 610 retransmits the data in sidelink control channel scheduled data resources. UE 615 may receive the fallback transmission over the fallback receive beam and may successfully decode the retransmission—e.g., due to the absence of blockages.

At block 680, UE 615 analyzes control channel resources in the retransmission to determine whether a data transmission has been scheduled for UE 615 in corresponding data channel resources. In some examples, UE 615 identifies its control channel resources based on a blind decoding process and corresponding data channel resources based on control information included in the identified control channel resources. After identifying its data channel resources, UE 615 may decode a signal transmitted over the data channel resources to obtain the transmitted data. In some cases, UE 615 performs an action based on decoding the data—e.g., UE 615 may actuate a motor and/or take sensor measurements.

At arrow 685, UE 615 transmits a feedback message to PLC 610. If UE 515 successfully decodes the data received in the retransmission, UE 615 may transmit an ACK message to PLC 610 along with measurement information. If UE 615 fails to decode the data received in the retransmission, UE 615 may transmit a NACK message to PLC 610. In some cases, UE 615 transmits the feedback message over different resources than UE 615 transmit the feedback message to the initial data transmission—e.g., UE 615 may transmit the feedback message over different frequency resources or over a fallback uplink transmission beam that corresponds to the direction of the fallback transmission beam.

At block 690, PLC 610 may switch back to the primary transmission beam before performing a subsequent initial data transmission over the sidelink. Concurrently at block 695, UE 615 may switch back to the primary receive beam before a periodically scheduled resource occurs. In other cases, UE 515 may not return to primary receive beam—e.g., UE 515 may use a single antenna configuration to receive transmissions from base station 505.

Accordingly, PLC 610 and UE 615 may repeat the operations described starting with arrow 650. In some cases, PLC 610 and UE 615 may successfully perform initial data transmissions after switching back to the primary transmission beam over the sidelink—e.g., if a blockage in the path of primary transmission beam has been removed. In other cases, subsequent initial data transmissions between PLC 610 and UE 615 may continue to fail, and PLC 610 and UE 615 may continue to fall back to their respective fallback beams for retransmissions of the data, as discussed above. In some cases, PLC 610 may be triggered to perform another beam sweeping procedure after a threshold number of transmission failures over the primary transmission beam occur within a designated interval—e.g., if the blockage does not move. After performing the additional beam sweeping procedure, base station 605 may identify a new primary and secondary transmission beam for transmissions between PLC 610 and UE 615, as discussed above.

Although the above operations are discussed in the context of transmissions from PLC 610 to UE 515, similar operations may be performed to support transmissions from UE 515 to PLC 610 and/or base station 505. That is, UE 515 may be configured to perform uplink transmissions over (in the direction of) the primary and second fallback transmission beams identified by base station 505 and/or PLC 610. And base station 505 and/or PLC 610 may be similarly configured to receive initial uplink transmission over the primary transmission beam, report acknowledgment feedback for the uplink transmissions, and receiving uplink retransmissions over the fallback transmission beam.

Figure 7:
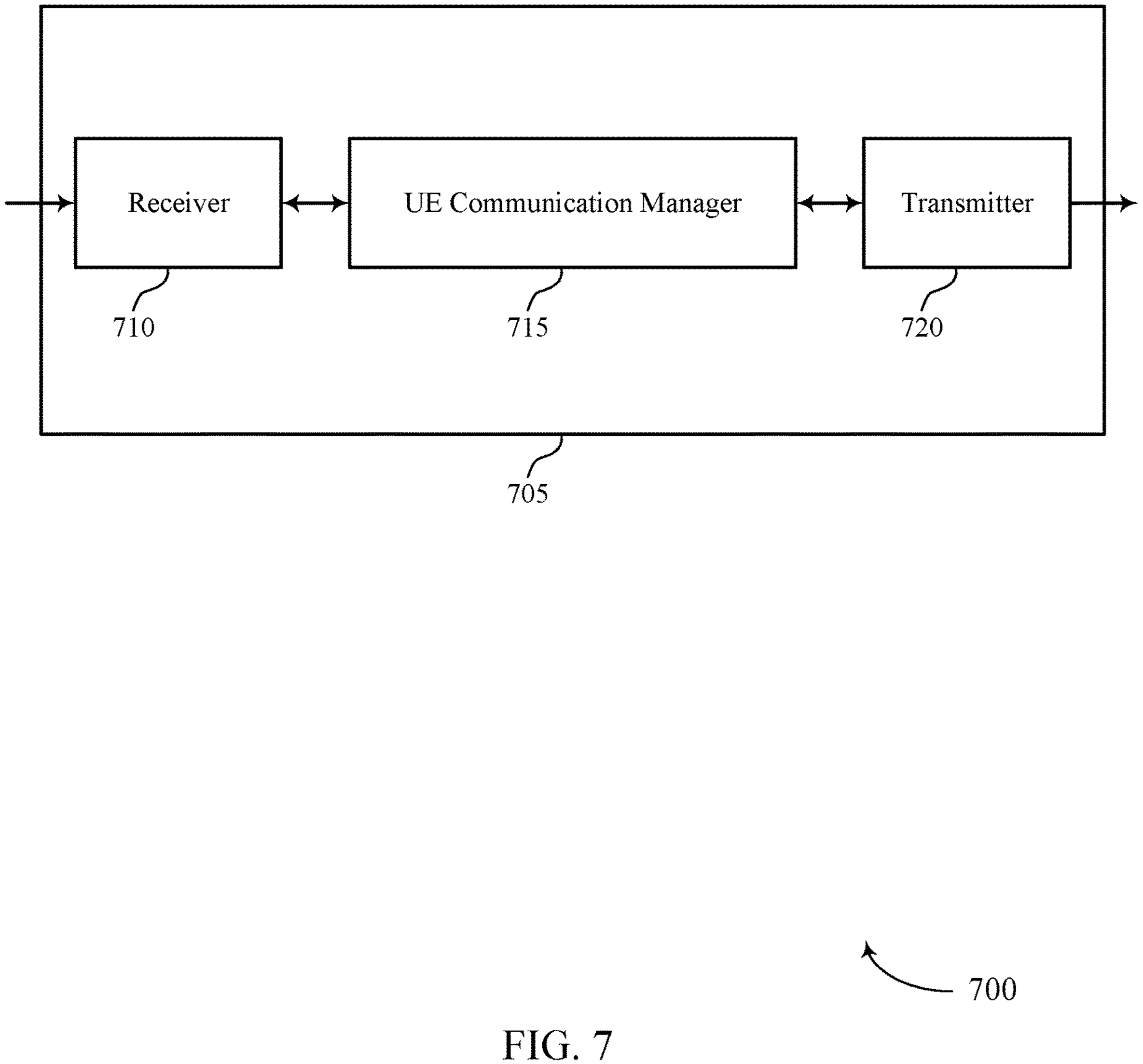
FIGS. 7 and 8 show block diagrams of devices that support switching to a fallback beam in accordance with various aspects of the present disclosure.

FIG. 7 shows a block diagram of a device that supports switching to a fallback beam in accordance with various aspects of the present disclosure. Block diagram 700 may provide a representation of a device 705. Device 705 may be an example of aspects of a UE or PLC as described herein. Device 705 may include receiver 710, UE communication manager 715, and transmitter 720. Device 705 may also include a processor. Each of these components may be in communication with one another (e.g., via one or more buses).

Receiver 710 may receive information such as packets, user data, or control information associated with various information channels (e.g., control channels, data channels, and information related to switching to a fallback beam, etc.). Information may be passed on to other components of device 705. Receiver 710 may be an example of aspects of the transceiver 915 described with reference to FIG. 9. Receiver 710 may utilize a single antenna or a set of antennas.

In some cases, UE communication manager 715 may be implemented in a UE that communicates directly with a base station. In such cases, UE communication manager 715 may receive a set of transmission beams and report CSI for the set of transmission beams. UE communication manager 715 may also receive an indication of a first transmission beam of the set of transmission beams based on the reported CSI, where the first transmission beam is configured to convey initial transmissions to the UE. UE communication manager 715 may also identify a second transmission beam of the set of transmission beams based on the indication, wherein the second transmission beam is configured to convey retransmissions to the UE. In some cases, UE communication manager 715 may fail to receive or decode, during a first interval, a first transmission of user data over the first transmission beam and may transmit a negative acknowledgment (NACK) message based on the failure to receive or decode the first transmission. UE communication manager 715 may receive, during a subsequent interval, a second transmission of the user data over the second transmission beam.

In some cases, UE communication manager 715 may receive a set of transmission beams and report CSI for the set of transmission beams. UE communication manager 715 may also receive an indication of a first transmission beam of the set of transmission beams based on the reported CSI, where the first transmission beam is configured to convey initial transmissions to the UE. UE communication manager 715 may also identify a second transmission beam of the set of transmission beams based on the indication, wherein the second transmission beam is configured to convey retransmissions to the UE. UE communication manager 715 may also transmit, during a first interval, a first transmission of user data over the first transmission beam. In some cases, UE communication manager 715 may receive a negative acknowledgment (NACK) message based on the first transmission. UE communication manager 715 may transmit, during a subsequent interval, a second transmission of the user data over the second transmission beam based on receiving the NACK message.

In some cases, UE communication manager 715 may be implemented in a UE that communicates directly with other UEs with the assistance of a base station. In such cases, UE communication manager 715 may transmit a set of transmission beams. UE communication manager 715 may also receive, from a base station, an indication of a first transmission beam of the set of transmission beams based on CSI reported to the base station by a second UE, where the first transmission beam is configured to convey initial transmissions from the first UE to the second UE. UE communication manager 715 may also identify a second transmission beam of the set of transmission beams based on the indication, wherein the second transmission beam is configured to convey retransmissions from the first UE to the second UE. UE communication manager 715 may transmit, to the second UE during a first interval, a first transmission of user data over the first transmission beam. In some cases, UE communication manager 715 may fail to receive or decode an acknowledgment (ACK) message in response to the first transmission, and may transmit, to the second UE during a subsequent interval, a second transmission of the user data over the second transmission beam based on the failure to receive or decode the ACK message.

UE communication manager 715, or its sub-components, may be implemented in hardware, code (e.g., software or firmware) executed by a processor, or any combination thereof. If implemented in code executed by a processor, the functions of the UE communication manager 715, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

UE communication manager 715, or its sub-components, may be physically located at various positions, including being distributed such that portions of functions are implemented at different physical locations by one or more physical components. In some examples, UE communication manager 715, or its sub-components, may be a separate and distinct component in accordance with various aspects of the present disclosure. In some examples, UE communication manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Transmitter 720 may transmit signals generated by other components of device 705. In some examples, transmitter 720 may be collocated with receiver 710 in a transceiver component. For example, transmitter 720 may be an example of aspects of the transceiver 915 described with reference to FIG. 9. Transmitter 720 may utilize a single antenna or a set of antennas.

Figure 8:
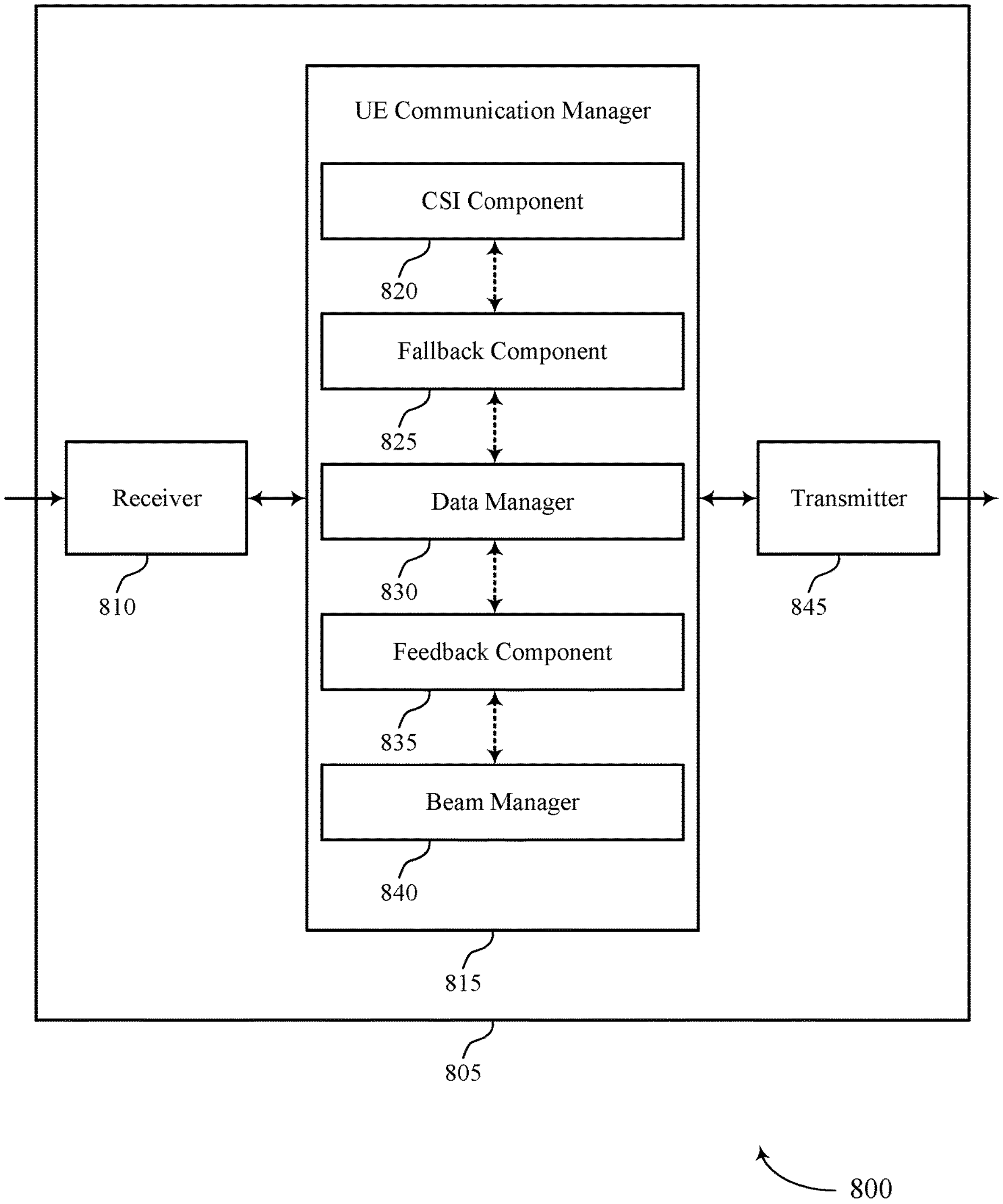

FIG. 8 shows a block diagram of a device that supports switching to a fallback beam in accordance with various aspects of the present disclosure. Block diagram 800 may provide a representation of a device 805. Device 805 may be an example of aspects of device 705, a UE, or PLC as described herein. Device 805 may include receiver 810, UE communication manager 815, and transmitter 845. Device 805 may also include a processor. Each of these components may be in communication with one another (e.g., via one or more buses).

Receiver 810 may receive information such as packets, user data, or control information associated with various information channels (e.g., control channels, data channels, and information related to switching to a fallback beam, etc.). Information may be passed on to other components of device 805. Receiver 810 may be an example of aspects of the transceiver 915 described with reference to FIG. 9. Receiver 810 may utilize a single antenna or a set of antennas.

UE communication manager 815 may be an example of aspects of UE communication manager 715 as described herein. UE communication manager 815 may include CSI component 820, fallback component 825, data manager 830, feedback component 835, and beam manager 840. UE communication manager 815 may be an example of aspects of the UE communication manager 910 described herein.

In some cases, UE communication manager 815 may be implemented in a UE that communicates directly with a base station and may operate as follows.

In some cases, beam manager 840 may receive a set of transmission beams. CSI component 820 may report CSI for the set of transmission beams.

Fallback component 825 may receive an indication of a first transmission beam of the set of transmission beams based on the reported CSI, where the first transmission beam is configured to convey initial transmissions to the UE. Fallback component 825 may also identify a second transmission beam of the set of transmission beams based on the indication, wherein the second transmission beam is configured to convey retransmissions to the UE. In some cases, the indication indicates the second transmission beam. In some cases, receiving the indication of the first transmission beam and the second transmission beam includes receiving a control message comprising a first field for indicating the first transmission beam for the first transmission and a second field for indicating the second transmission beam for the second transmission. In other cases, identifying the second transmission beam includes determining a mapping between the first transmission beam and the second transmission beam based at least in part on a table. In some cases, the table may be stored at device 805. In some examples, the fallback component 825 may switch from a first receive beam that corresponds to the first transmission beam to a second receive beam that corresponds to the second transmission beam based on transmitting the NACK message.

Data manager 830 may fail to receive or decode, during a first interval, a first transmission of user data over the first transmission beam. In some examples, data manager 830 receives an indication of a set of periodic intervals during which the UE is scheduled to receive initial transmissions of user data, where the set of periodic intervals includes the first interval.

Feedback component 835 may transmit a negative acknowledgment (NACK) message based on the failure to receive or decode the first transmission.

In some examples, data manager 830 may receive, during a subsequent interval, a second transmission of the user data over the second transmission beam. In some examples, data manager 830 receives the second transmission of the user data during the subsequent interval based on receiving control information in a control channel that indicates a location of the user data in a data channel.

In some cases, UE communication manager 715 may be implemented in a UE that communicates directly with other UEs with the assistance of a base station and may operate as follows.

In some cases, beam manager 840 may transmit a set of transmission beams. In some examples, fallback component 825 may receive, from a base station, an indication of a first transmission beam of the set of transmission beams based on CSI reported to the base station by a second UE, where the first transmission beam is configured to convey initial transmissions from the first UE to the second UE. Fallback component 825 may also identify a second transmission beam of the set of transmission beam based on the indication, wherein the second transmission beam is configured to convey retransmissions from the first UE to the second UE. In some examples, fallback component 825 may switch from the first transmission beam to the second transmission beam based on failing to receive or decode the ACK message.

In some examples, data manager 830 may transmit, to the second UE during a first interval, a first transmission of user data over the first transmission beam. In some examples, data manager 830 transmits an indication of a set of periodic intervals during which the second UE is scheduled to receive initial transmissions of user data, where the set of periodic intervals includes the first interval.

In some examples, feedback component 835 may fail to receive or decode an acknowledgment (ACK) message in response to the first transmission.

In some examples, data manager 830 may transmit, to the second UE during a subsequent interval, a second transmission of the user data over the second transmission beam based on the failure to receive or decode the ACK message. In some examples, data manager 830 transmits the second transmission of the user data during the subsequent interval based on transmitting control information in a control channel that indicates a location of the user data in a data channel.

Transmitter 845 may transmit signals generated by other components of the device 805. In some examples, transmitter 845 may be collocated with receiver 810 in a transceiver component. For example, transmitter 845 may be an example of aspects of the transceiver 915 described with reference to FIG. 9. Transmitter 845 may utilize a single antenna or a set of antennas.

Figure 9:
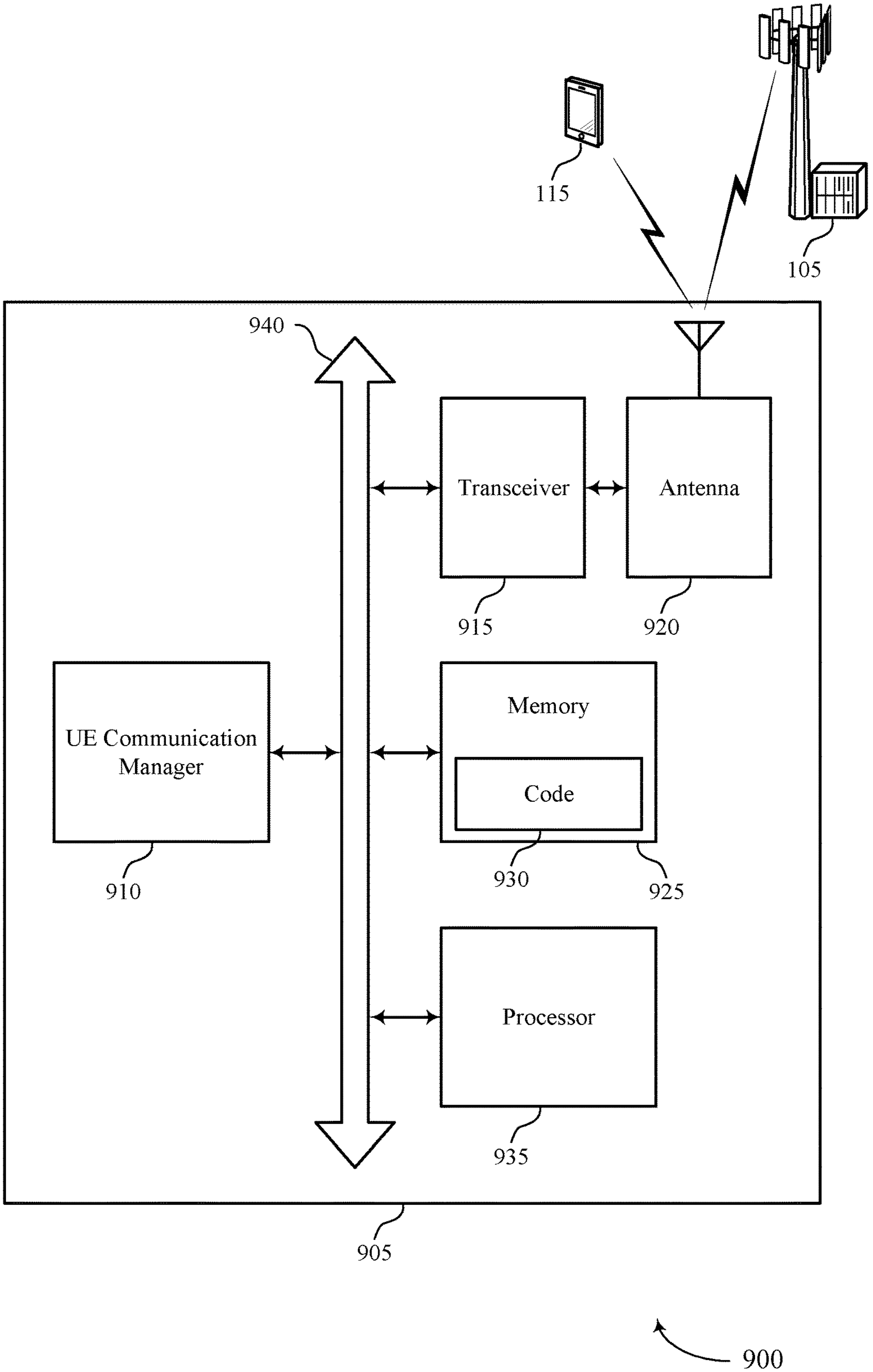
FIG. 9 shows a diagram of a system including a device that supports switching to a fallback beam in accordance with various aspects of the present disclosure.

FIG. 9 shows a diagram of a system including a device that supports switching to a fallback beam in accordance with various aspects of the present disclosure. The system 900 may include device 905. Device 905 may be an example of or include the components of device 705, device 805, or a UE 115 as described herein. The device 905 may include components for bi-directional voice and data communications including components for transmitting and receiving communications, including a UE communication manager 910, a transceiver 915, an antenna 920, memory 925, and a processor 935. These components may be in electronic communication via one or more buses (e.g., bus 940).

The UE communication manager 910 may be an example of UE communication manager 715 or UE communication manager 815.

The transceiver 915 may communicate bi-directionally, via one or more antennas, wired, or wireless links as described above. For example, the transceiver 915 may represent a wireless transceiver and may communicate bi-directionally with another wireless transceiver. The transceiver 915 may also include a modem to modulate the packets and provide the modulated packets to the antennas for transmission, and to demodulate packets received from the antennas.

In some cases, the wireless device may include a single antenna 920. However, in some cases the device may have more than one antenna 920, which may be capable of concurrently transmitting or receiving multiple wireless transmissions.

The memory 925 may include random-access memory (RAM) and read-only memory (ROM). The memory 925 may store computer-readable, computer-executable code 930 including instructions that, when executed, cause the processor to perform various functions described herein. In some cases, the memory 925 may contain, among other things, a basic input/output system (BIOS) which may control basic hardware or software operation such as the interaction with peripheral components or devices.

The code 930 may include instructions to implement aspects of the present disclosure, including instructions to support wireless communications. The code 930 may be stored in a non-transitory computer-readable medium such as system memory or other type of memory. In some cases, the code 930 may not be directly executable by the processor 935 but may cause a computer (e.g., when compiled and executed) to perform functions described herein.

The processor 935 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 935 may be configured to operate a memory array using a memory controller. In other cases, a memory controller may be integrated into the processor 935. The processor 935 may be configured to execute computer-readable instructions stored in a memory (e.g., the memory 925) to cause the device 905 to perform various functions (e.g., functions or tasks supporting switching to a fallback beam).

Figure 10:
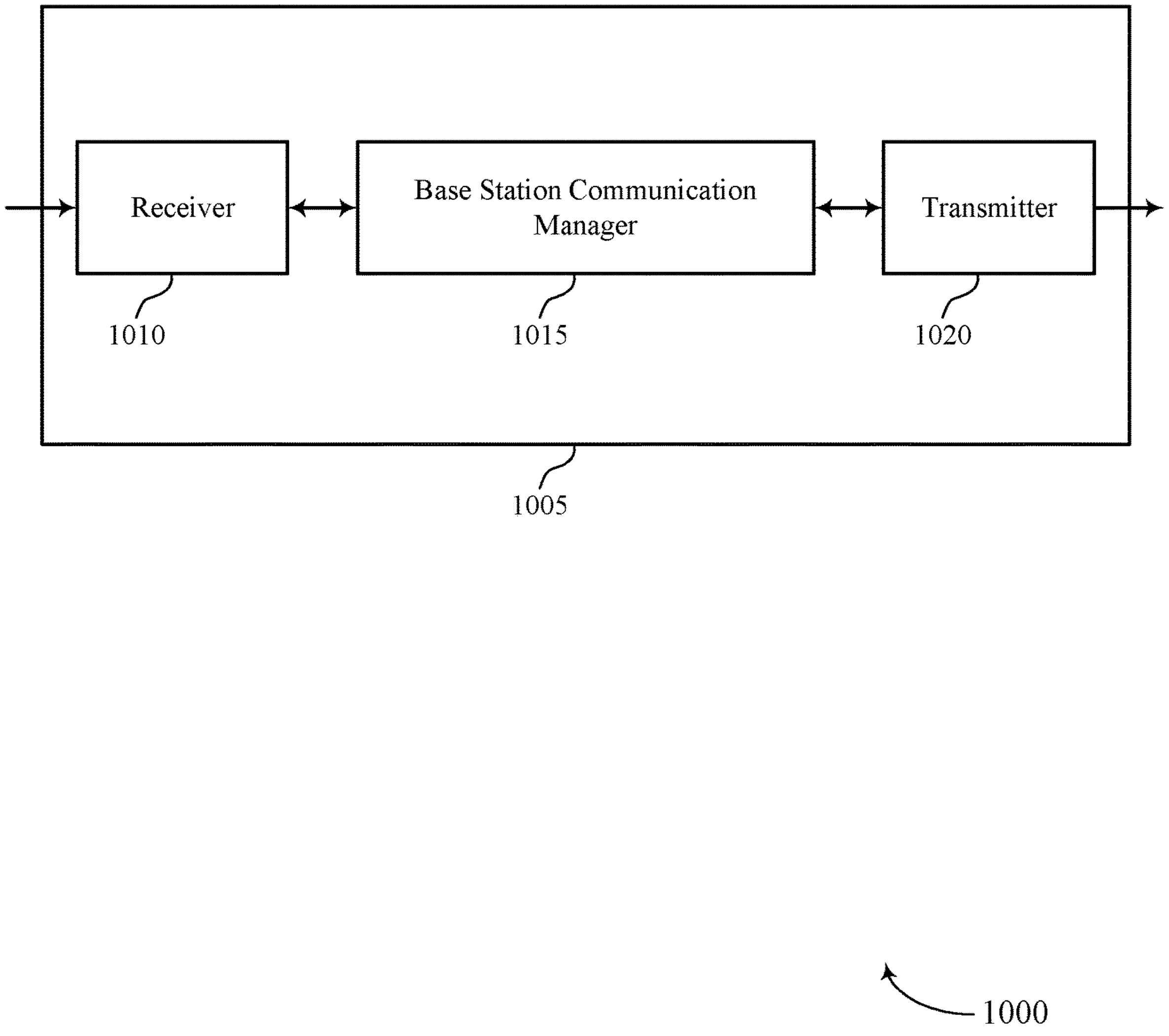
FIGS. 10 and 11 show block diagrams of devices that support switching to a fallback beam in accordance with various aspects of the present disclosure.

FIG. 10 shows a block diagram of device that supports switching to a fallback beam in accordance with various aspects of the present disclosure. Block diagram 1000 may represent device 1005. Device 1005 may be an example of aspects of a base station or PLC as described herein. Device 1005 may include receiver 1010, base station communication manager 1015, and transmitter 1020. Device 1005 may also include a processor. Each of these components may be in communication with one another (e.g., via one or more buses).

Receiver 1010 may receive information such as packets, user data, or control information associated with various information channels (e.g., control channels, data channels, and information related to switching to a fallback beam, etc.). Information may be passed on to other components of device 1005. Receiver 1010 may be an example of aspects of the transceiver 1220 described with reference to FIG. 12. Receiver 1010 may utilize a single antenna or a set of antennas.

Base station communication manager 1015 may transmit a set of transmission beams. Base station communication manager 1015 may also receive CSI for the set of transmission beams, the CSI including CSI reported by a UE, and may identify a first transmission beam and a second transmission beam of the set of transmission beams based on the CSI. Base station communication manager 1015 may transmit, to the UE, an indication of the first transmission beam based on the reported CSI, where the first transmission beam is configured to convey initial transmissions to the UE and the second transmission beam is configured to convey retransmissions to the UE. Base station communication manager 1015 may also transmit, to the UE during a first interval, a first transmission of user data over the first transmission beam. In some cases, base station communication manager 1015 may fail to receive or decode an acknowledgment (ACK) message in response to the first transmission, and may transmit, to the UE during a subsequent interval, a second transmission of the user data over the second transmission beam based on the failure to receive or decode the ACK message.

The base station communication manager 1015, or its sub-components, may be implemented in hardware, code (e.g., software or firmware) executed by a processor, or any combination thereof. If implemented in code executed by a processor, the functions of the base station communication manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

Base station communication manager 1015, or its sub-components, may be physically located at various positions, including being distributed such that portions of functions are implemented at different physical locations by one or more physical components. In some examples, base station communication manager 1015, or its sub-components, may be a separate and distinct component in accordance with various aspects of the present disclosure. In some examples, the base station communication manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver component. For example, the transmitter 1020 may be an example of aspects of the transceiver 1220 described with reference to FIG. 12. The transmitter 1020 may utilize a single antenna or a set of antennas.

Figure 11:
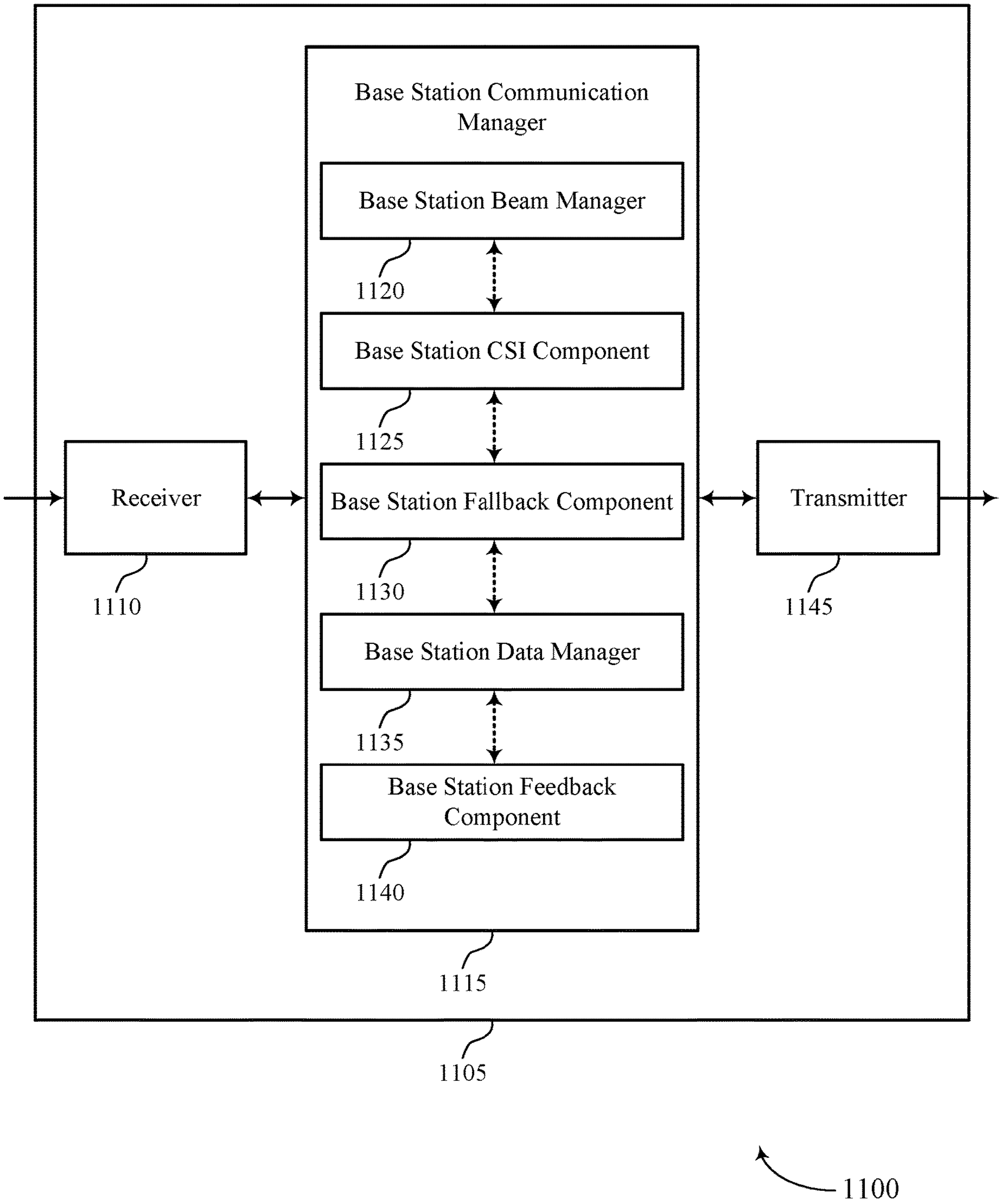

FIG. 11 shows a block diagram of a device that supports switching to a fallback beam in accordance with various aspects of the present disclosure. Block diagram 110 may represent a device 1105. Device 1105 may be an example of aspects of device 1005, a base station, or PLC as described herein. The device 1105 may include receiver 1110, base station communication manager 1115, and transmitter 1145. Device 1105 may also include a processor. Each of these components may be in communication with one another (e.g., via one or more buses).

Receiver 1110 may receive information such as packets, user data, or control information associated with various information channels (e.g., control channels, data channels, and information related to switching to a fallback beam, etc.). Information may be passed on to other components of device 1105. Receiver 1110 may be an example of aspects of the transceiver 1220 described with reference to FIG. 12. Receiver 1110 may utilize a single antenna or a set of antennas.

Base station communication manager 1115 may be an example of aspects of base station communication manager 1015 as described herein. Base station communication manager 1115 may include base station beam manager 1120, base station CSI component 1125, base station fallback component 1130, base station data manager 1135, and base station feedback component 1140. Base station communication manager 1115 may be an example of aspects of the base station communication manager 1210 described herein.

Base station beam manager 1120 may transmit a set of transmission beams. In some examples, base station beam manager 1120 transmits a first transmission beam of the set of transmission beams from a first TRP and a second transmission beam from a second TRP.

Base station CSI component 1125 may receive CSI for the set of transmission beams, the CSI including CSI reported by a UE. When device 1105 is configured as a PLC that uses a base station to perform scheduling tasks, base station CSI component 1125 may receive the CSI reported by the UE from a base station and may receive CSI that includes CSI reported by a second UE. In some examples, base station CSI component 1125 generates a table that provides mappings between primary and fallback transmission beams based at least in part on the CSI.

Base station fallback component 1130 may identify a first transmission beam and a second transmission beam of the set of transmission beams based on the CSI. In some examples, base station fallback component 1130 may transmit, to the UE, an indication of the first transmission beam based on the reported CSI, where the first transmission beam is configured to convey initial transmissions to the UE and the second transmission beam is configured to convey retransmissions to the UE. When device 1105 is configured as a PLC that uses a base station to perform scheduling tasks, base station fallback component 1130 may identify the first transmission beam and the second transmission beam based on receiving the indication of the first transmission beam from the base station. In some examples, the indication indicates the second transmission beam—e.g., the indication of the first transmission beam may be indicated in a first field of a DCI message and the indication of the second transmission beam may be indicated in a second field of the DCI message. In other examples, base station fallback component 1130 transmits, to the UE, the table, wherein the table comprises a mapping between the first transmission beam and the second transmission beam.

In some examples, base station fallback component 1130 may compute a set of spatial diversity values between transmission beams of the set of transmission beams. In some examples, base station fallback component 1130 may select the first transmission beam and the second transmission beam based on determining that a spatial diversity value computed between the first transmission beam and the second transmission beam exceeds a threshold. In some examples, base station fallback component 1130 may compute a set of channel quality values for the set of transmission beams based on the CSI reported by the UE, where computing the set of spatial diversity values includes computing the set of spatial diversity values between transmission beams of a subset of the set of transmission beams having channel quality values exceeding a second threshold, where the subset of the set of transmission beams includes the first transmission beam and the second transmission beam. When device 1105 is configured as a PLC that uses a base station to perform scheduling tasks, base station fallback component 1130 may transmit, to the second UE, a second indication of the first transmission beam and the second transmission beam based on the reported CSI, where the first transmission beam is configured to convey initial transmissions from the second UE to the UE and the second transmission beam is configured to convey retransmissions from the second UE to the UE.

Base station data manager 1135 may transmit, to the UE during a first interval, a first transmission of user data over the first transmission beam. In some examples, base station data manager 1135 may transmit an indication of a set of periodic intervals during which the UE is scheduled to receive initial transmissions of user data, where the set of periodic intervals includes the first interval.

Base station feedback component 1140 may fail to receive or decode an acknowledgment (ACK) message in response to the first transmission.

Base station data manager 1135 may transmit, to the UE during a subsequent interval, a second transmission of the user data over the second transmission beam based on the failure to receive or decode the ACK message. In some examples, base station data manager 1135 may transmit the second transmission of the user data during the subsequent interval based on transmitting control information in a control channel that indicates a location of the user data in a data channel.

Transmitter 1145 may transmit signals generated by other components of the device 1105. In some examples, transmitter 1145 may be collocated with receiver 1110 in a transceiver component. For example, transmitter 1145 may be an example of aspects of the transceiver 1220 described with reference to FIG. 12. Transmitter 1145 may utilize a single antenna or a set of antennas.

Figure 12:
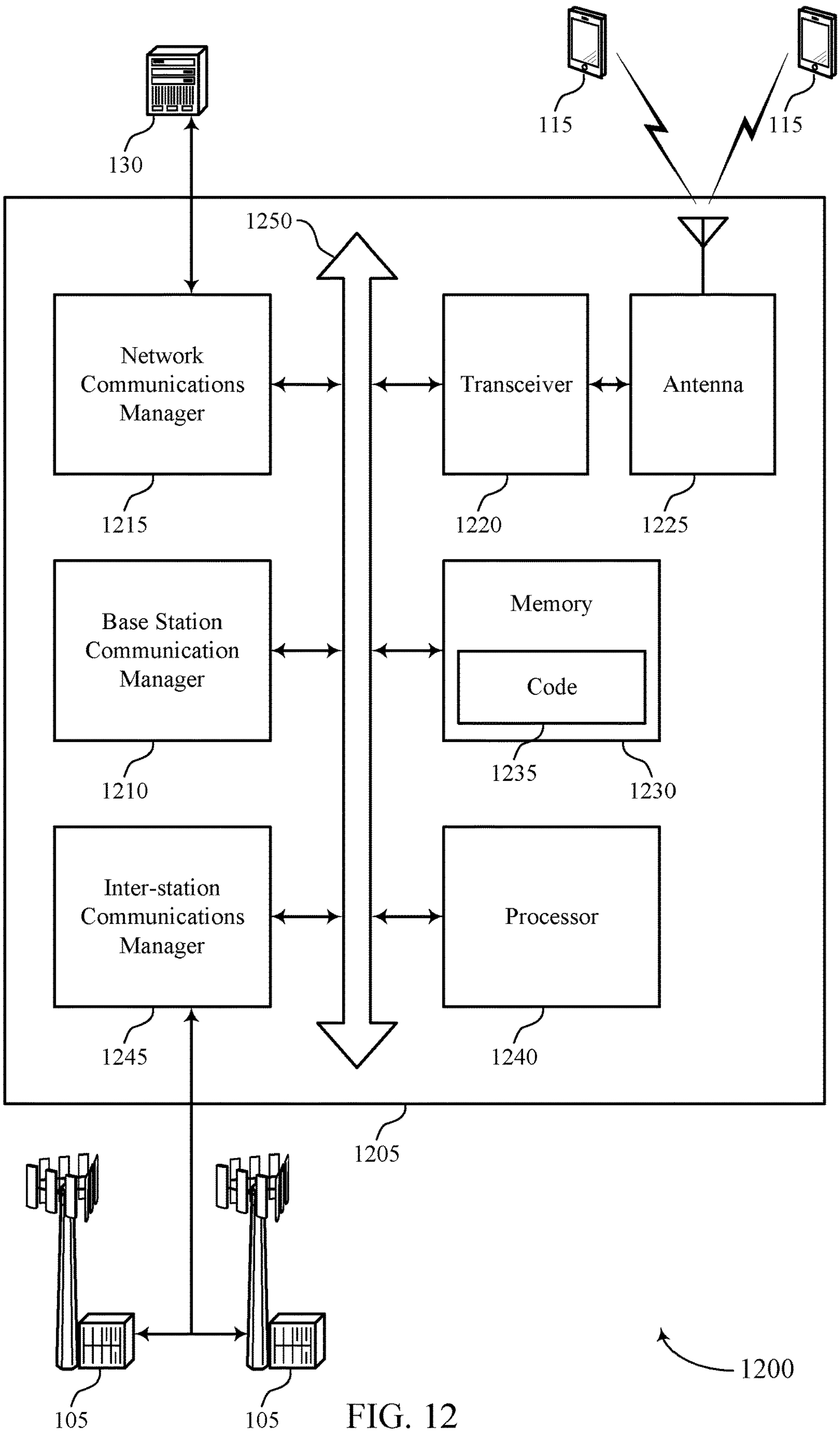
FIG. 12 shows a diagram of a system including a device that supports switching to a fallback beam in accordance with various aspects of the present disclosure.

FIG. 12 shows a diagram of a system including a device that supports switching to a fallback beam in accordance with various aspects of the present disclosure. System 1200 may include device 1205. Device 1205 may be an example of or include the components of device 1005, device 1105, or a base station 105 as described herein. The device 1205 may include components for bi-directional voice and data communications including components for transmitting and receiving communications, including a base station communication manager 1210, a network communications manager 1215, a transceiver 1220, an antenna 1225, memory 1230, a processor 1240, and an inter-station communications manager 1245. These components may be in electronic communication via one or more buses (e.g., bus 1250).

The base station communication manager 1210 may be an example of base station communication manager 1015 or base station communication manager 1115.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM and ROM. The memory 1230 may store computer-readable, computer-executable code 1235 including instructions that, when executed, cause the processor to perform various functions described herein. In some cases, the memory 1230 may contain, among other things, a BIOS which may control basic hardware or software operation such as the interaction with peripheral components or devices.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting switching to a fallback beam).

The inter-station communications manager 1245 may manage communications with other base station 105 and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

Figure 13:
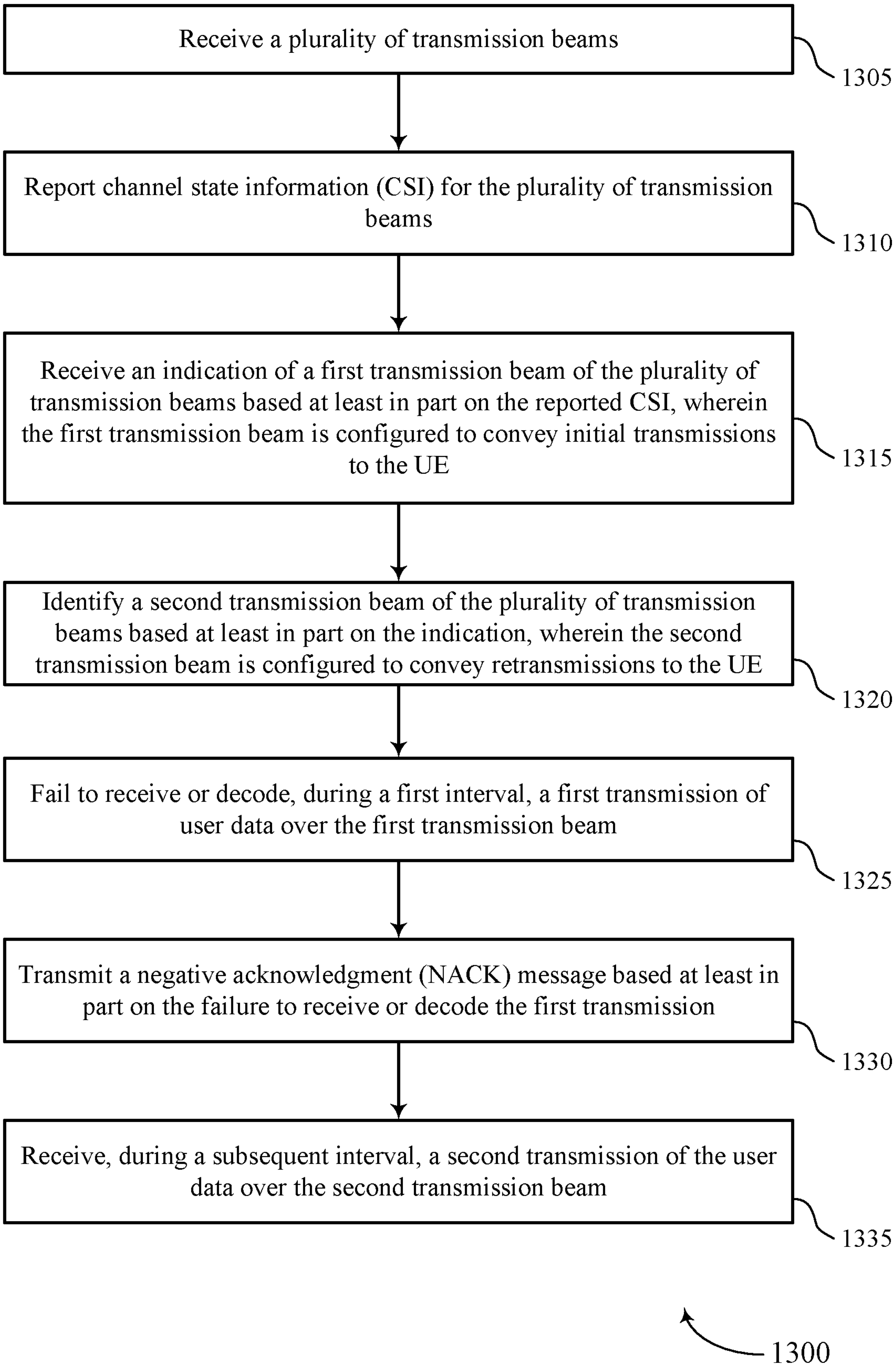
FIGS. 13 through 16 show flowcharts illustrating methods that support switching to a fallback beam in accordance with various aspects of the present disclosure.

FIG. 13 shows a flowchart illustrating a method that supports switching to a fallback beam in accordance with various aspects of the present disclosure. The operations of method 1300 may be implemented by a UE 115 or its components as described herein. For example, the operations of method 1300 may be performed by a communication manager as described with reference to FIGS. 7 through 9. In some examples, a UE may execute a set of instructions to control the functional elements of the UE to perform the described functions. Additionally, or alternatively, a UE may perform aspects of the described functions using special-purpose hardware.

At 1305, the UE may receive a plurality of transmission beams. The operations of 1305 may be performed according to the methods described herein. In some examples, aspects of the operations of 1305 may be performed by a beam manager as described with reference to FIGS. 7 through 9.

At 1310, the UE may report channel state information (CSI) for the plurality of transmission beams. The operations of 1310 may be performed according to the methods described herein. In some examples, aspects of the operations of 1310 may be performed by a CSI component as described with reference to FIGS. 7 through 9.

At 1315, the UE may receive an indication of a first transmission beam of the plurality of transmission beams based at least in part on the reported CSI, wherein the first transmission beam is configured to convey initial transmissions to the UE. The operations of 1315 may be performed according to the methods described herein. In some examples, aspects of the operations of 1315 may be performed by a fallback component as described with reference to FIGS. 7 through 9.

At 1320, the UE may identify a second transmission beam of the plurality of transmission beams based at least in part on the indication, wherein the second transmission beam is configured to convey retransmissions to the UE. The operations of 1320 may be performed according to the methods described herein. In some examples, aspects of the operations of 1320 may be performed by a fallback component as described with reference to FIGS. 7 through 9.

At 1325, the UE may fail to receive or decode, during a first interval, a first transmission of user data over the first transmission beam. The operations of 1325 may be performed according to the methods described herein. In some examples, aspects of the operations of 1325 may be performed by a data manager as described with reference to FIGS. 7 through 9.

At 1330, the UE may transmit a negative acknowledgment (NACK) message based at least in part on the failure to receive or decode the first transmission. The operations of 1330 may be performed according to the methods described herein. In some examples, aspects of the operations of 1330 may be performed by a feedback component as described with reference to FIGS. 7 through 9.

At 1335, the UE may receive, during a subsequent interval, a second transmission of the user data over the second transmission beam. The operations of 1335 may be performed according to the methods described herein. In some examples, aspects of the operations of 1335 may be performed by a data manager as described with reference to FIGS. 7 through 9.

Figure 14:
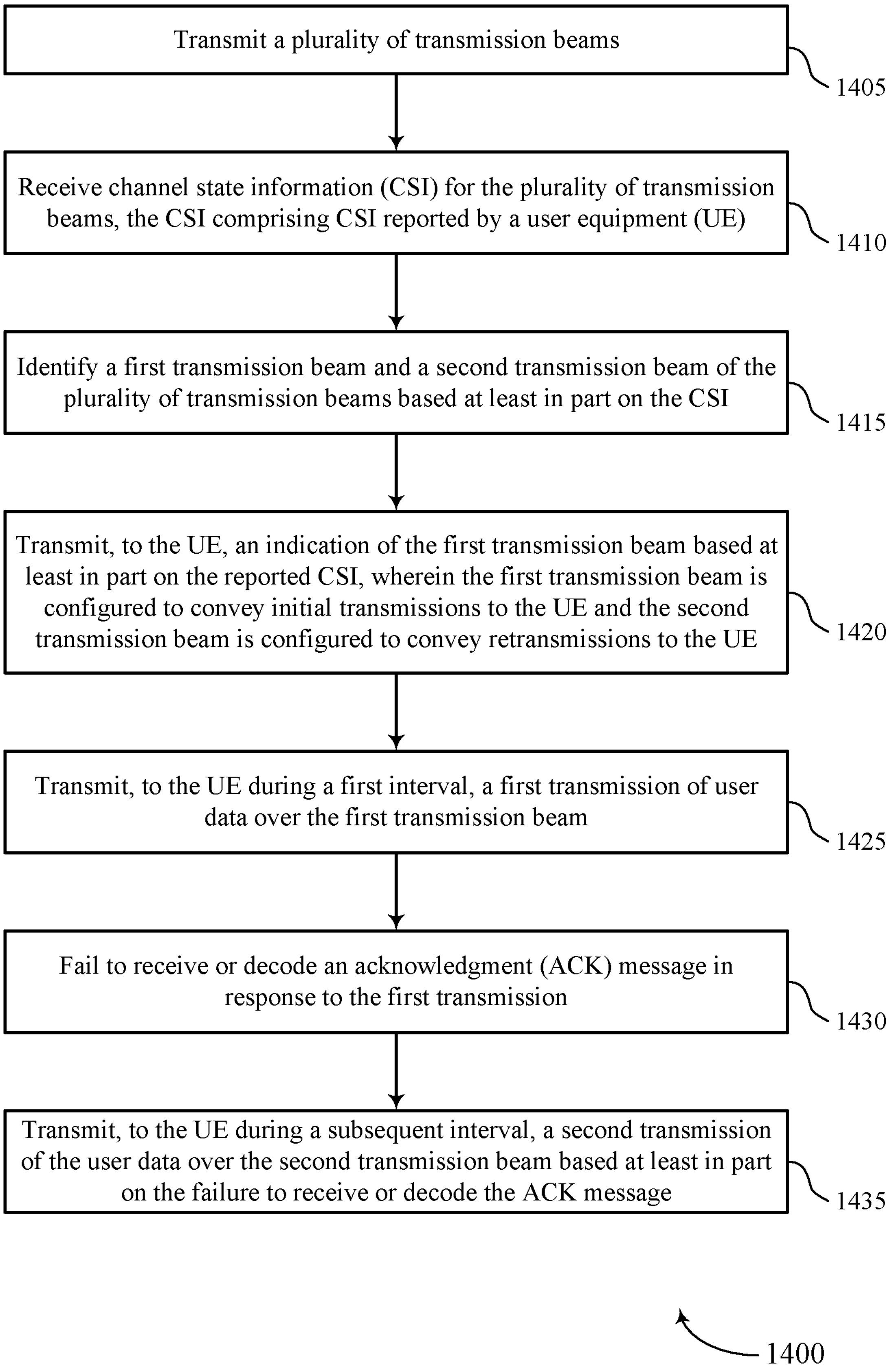

FIG. 14 shows a flowchart illustrating a method that supports switching to a fallback beam in accordance with various aspects of the present disclosure. The operations of method 1400 may be implemented by a base station 105 or its components as described herein. For example, the operations of method 1400 may be performed by a communication manager as described with reference to FIGS. 10 through 12. In some examples, a base station may execute a set of instructions to control the functional elements of the base station to perform the described functions. Additionally, or alternatively, a base station may perform aspects of the described functions using special-purpose hardware.

At 1405, the base station may transmit a plurality of transmission beams. The operations of 1405 may be performed according to the methods described herein. In some examples, aspects of the operations of 1405 may be performed by a beam manager as described with reference to FIGS. 10 through 12.

At 1410, the base station may receive channel state information (CSI) for the plurality of transmission beams, the CSI comprising CSI reported by a user equipment (UE). The operations of 1410 may be performed according to the methods described herein. In some examples, aspects of the operations of 1410 may be performed by a CSI component as described with reference to FIGS. 10 through 12.

At 1415, the base station may identify a first transmission beam and a second transmission beam of the plurality of transmission beams based at least in part on the CSI. The operations of 1415 may be performed according to the methods described herein. In some examples, aspects of the operations of 1415 may be performed by a fallback component as described with reference to FIGS. 10 through 12.

At 1420, the base station may transmit, to the UE, an indication of the first transmission beam based at least in part on the reported CSI, wherein the first transmission beam is configured to convey initial transmissions to the UE and the second transmission beam is configured to convey retransmissions to the UE. The operations of 1420 may be performed according to the methods described herein. In some examples, aspects of the operations of 1420 may be performed by a fallback component as described with reference to FIGS. 10 through 12.

At 1425, the base station may transmit, to the UE during a first interval, a first transmission of user data over the first transmission beam. The operations of 1425 may be performed according to the methods described herein. In some examples, aspects of the operations of 1425 may be performed by a data manager as described with reference to FIGS. 10 through 12.

At 1430, the base station may fail to receive or decode an acknowledgment (ACK) message in response to the first transmission. The operations of 1430 may be performed according to the methods described herein. In some examples, aspects of the operations of 1430 may be performed by a feedback component as described with reference to FIGS. 10 through 12.

At 1435, the base station may transmit, to the UE during a subsequent interval, a second transmission of the user data over the second transmission beam based at least in part on the failure to receive or decode the ACK message. The operations of 1435 may be performed according to the methods described herein. In some examples, aspects of the operations of 1435 may be performed by a data manager as described with reference to FIGS. 10 through 12.

Figure 15:
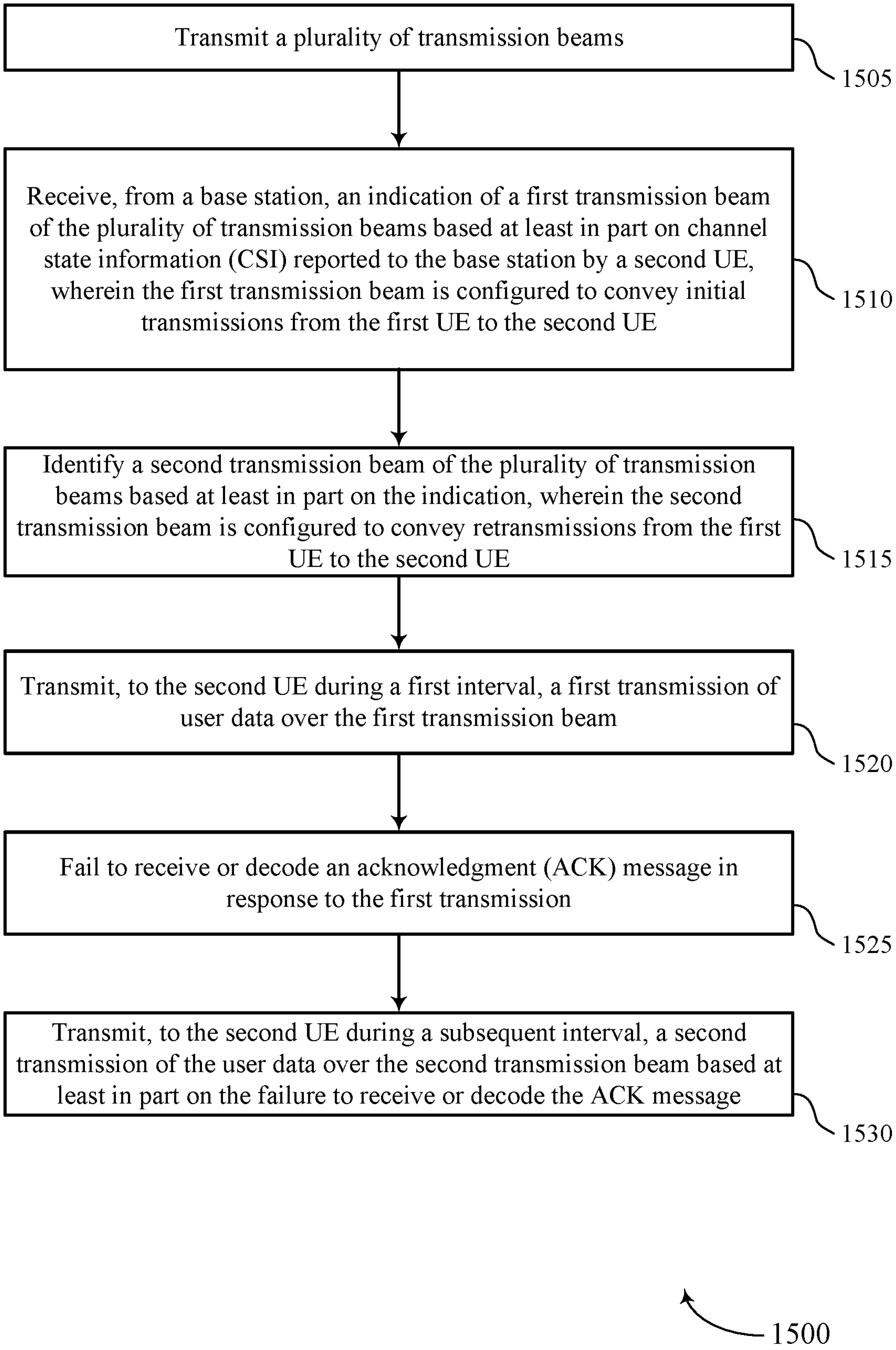

FIG. 15 shows a flowchart illustrating a method that supports switching to a fallback beam in accordance with various aspects of the present disclosure. The operations of method 1500 may be implemented by a UE 115 or its components as described herein. For example, the operations of method 1500 may be performed by a communication manager as described with reference to FIGS. 7 through 9. In some examples, a UE may execute a set of instructions to control the functional elements of the UE to perform the described functions. Additionally, or alternatively, a UE may perform aspects of the described functions using special-purpose hardware.

At 1505, the UE may transmit a plurality of transmission beams. The operations of 1505 may be performed according to the methods described herein. In some examples, aspects of the operations of 1505 may be performed by a beam manager as described with reference to FIGS. 7 through 9.

At 1510, the UE may receive, from a base station, an indication of a first transmission beam of the plurality of transmission beams based at least in part on channel state information (CSI) reported to the base station by a second UE, wherein the first transmission beam is configured to convey initial transmissions from the first UE to the second UE. The operations of 1510 may be performed according to the methods described herein. In some examples, aspects of the operations of 1510 may be performed by a fallback component as described with reference to FIGS. 7 through 9.

At 1515, the UE may identify a second transmission beam of the plurality of transmission beams based at least in part on the indication, wherein the second transmission beam is configured to convey retransmissions from the first UE to the second UE. The operations of 1515 may be performed according to the methods described herein. In some examples, aspects of the operations of 1515 may be performed by a fallback component as described with reference to FIGS. 7 through 9.

At 1520, the UE may transmit, to the second UE during a first interval, a first transmission of user data over the first transmission beam. The operations of 1520 may be performed according to the methods described herein. In some examples, aspects of the operations of 1520 may be performed by a data manager as described with reference to FIGS. 7 through 9.

At 1525, the UE may fail to receive or decode an acknowledgment (ACK) message in response to the first transmission. The operations of 1525 may be performed according to the methods described herein. In some examples, aspects of the operations of 1525 may be performed by a feedback component as described with reference to FIGS. 7 through 9.

At 1530, the UE may transmit, to the second UE during a subsequent interval, a second transmission of the user data over the second transmission beam based at least in part on the failure to receive or decode the ACK message. The operations of 1530 may be performed according to the methods described herein. In some examples, aspects of the operations of 1530 may be performed by a data manager as described with reference to FIGS. 7 through 9.

Figure 16:
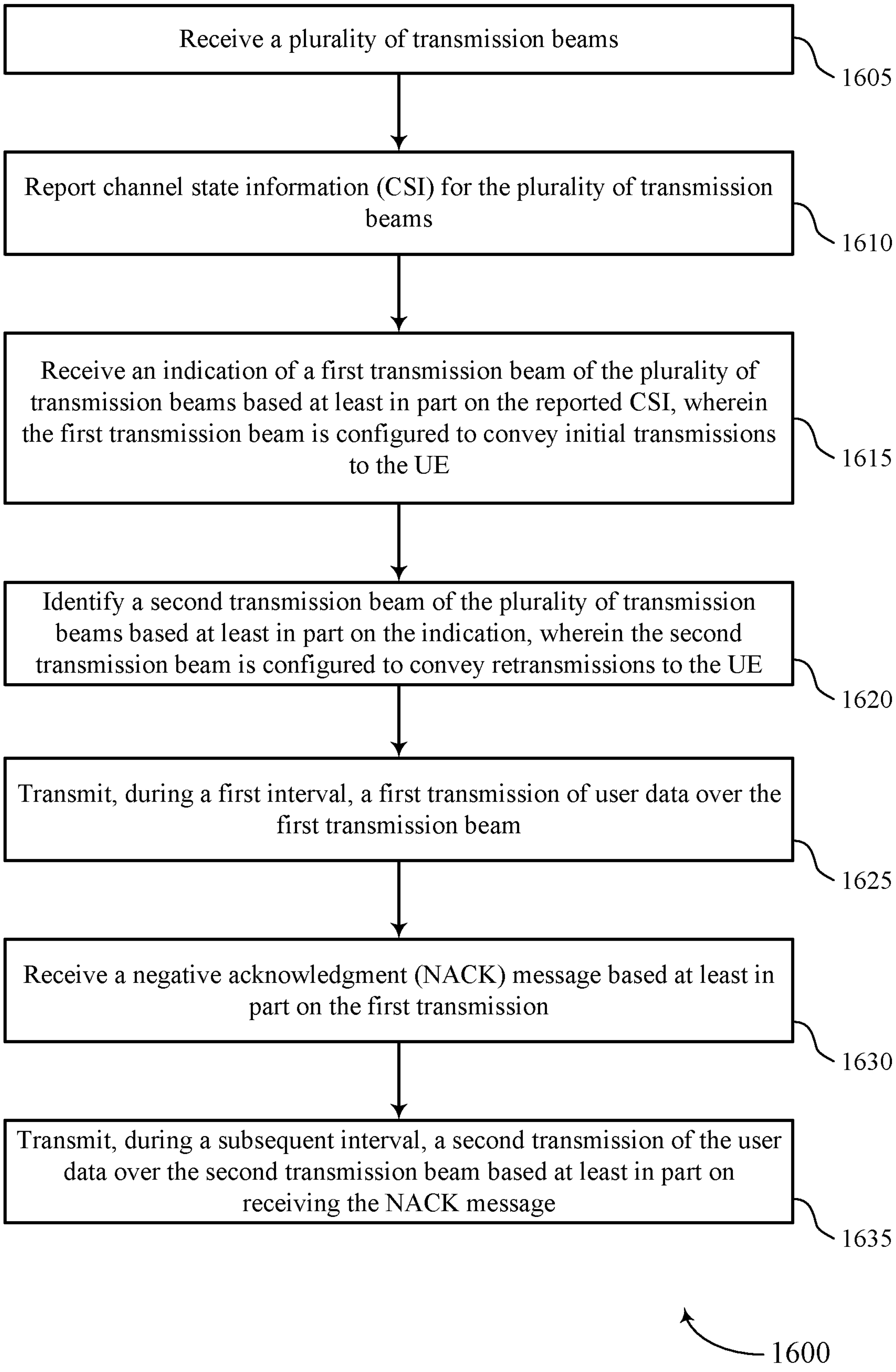

FIG. 16 shows a flowchart illustrating a method that supports switching to a fallback beam in accordance with various aspects of the present disclosure. The operations of method 1600 may be implemented by a UE 115 or its components as described herein. For example, the operations of method 1600 may be performed by a communication manager as described with reference to FIGS. 7 through 9. In some examples, a UE may execute a set of instructions to control the functional elements of the UE to perform the described functions. Additionally, or alternatively, a UE may perform aspects of the described functions using special-purpose hardware.

At 1605, the UE may receive a plurality of transmission beams. The operations of 1605 may be performed according to the methods described herein. In some examples, aspects of the operations of 1605 may be performed by a beam manager as described with reference to FIGS. 7 through 9.

At 1610, the UE may report channel state information (CSI) for the plurality of transmission beams. The operations of 1610 may be performed according to the methods described herein. In some examples, aspects of the operations of 1610 may be performed by a CSI component as described with reference to FIGS. 7 through 9.

At 1615, the UE may receive an indication of a first transmission beam of the plurality of transmission beams based at least in part on the reported CSI, wherein the first transmission beam is configured to convey initial transmissions to the UE. The operations of 1615 may be performed according to the methods described herein. In some examples, aspects of the operations of 1615 may be performed by a fallback component as described with reference to FIGS. 7 through 9.

At 1620, the UE may identify a second transmission beam of the plurality of transmission beams based at least in part on the indication, wherein the second transmission beam is configured to convey retransmissions to the UE. The operations of 1620 may be performed according to the methods described herein. In some examples, aspects of the operations of 1620 may be performed by a fallback component as described with reference to FIGS. 7 through 9.

At 1625, the UE may transmit, during a first interval, a first transmission of user data over the first transmission beam. The operations of 1625 may be performed according to the methods described herein. In some examples, aspects of the operations of 1625 may be performed by a data manager as described with reference to FIGS. 7 through 9.

At 1630, the UE may receive a negative acknowledgment (NACK) message based at least in part on the first transmission. The operations of 1630 may be performed according to the methods described herein. In some examples, aspects of the operations of 1630 may be performed by a feedback component as described with reference to FIGS. 7 through 9.

At 1635, the UE may transmit, during a subsequent interval, a second transmission of the user data over the second transmission beam based at least in part on receiving the NACK message. The operations of 1635 may be performed according to the methods described herein. In some examples, aspects of the operations of 1635 may be performed by a data manager as described with reference to FIGS. 7 through 9.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first user equipment (UE), comprising:
- receiving a plurality of transmission beams;
- reporting, to an access network entity, channel state information (CSI) for the plurality of transmission beams;
- receiving an indication of a first transmission beam of the plurality of transmission beams based at least in part on the reported CSI, wherein the first transmission beam is configured to convey initial transmissions from a second UE to the first UE;
- identifying a second transmission beam of the plurality of transmission beams based at least in part on the indication, wherein the second transmission beam is configured to convey retransmissions from the second UE to the first UE;
- failing, after identifying the second transmission beam, to receive or decode, during a first interval, a first transmission of user data over the first transmission beam;
- transmitting a negative acknowledgment (NACK) message based at least in part on failing to receive or decode the first transmission;
- switching to the second transmission beam in response to failing to receive or decode the first transmission; and
- receiving, during a subsequent interval, a second transmission of the user data over the second transmission beam.

2. The method of claim 1, further comprising:
- switching from a first receive beam that corresponds to the first transmission beam to a second receive beam that corresponds to the second transmission beam in response to failing to receive or decode the first transmission.

3. The method of claim 1, further comprising:

receiving an indication of a plurality of periodic intervals during which the first UE is scheduled to receive initial transmissions of user data, wherein the plurality of periodic intervals comprises the first interval.

4. The method of claim 1, wherein receiving the second transmission of the user data during the subsequent interval comprises receiving control information in a control channel that indicates a location of the user data in a data channel.

5. The method of claim 1, wherein a spatial diversity between the first transmission beam and the second transmission beam exceeds a threshold.

6. The method of claim 1, wherein the indication indicates the second transmission beam.

7. The method of claim 6, wherein receiving the indication of the first transmission beam and the second transmission beam comprises receiving a control message comprising a first field for indicating the first transmission beam for the first transmission and a second field for indicating the second transmission beam for the second transmission.

8. The method of claim 1, wherein identifying the second transmission beam comprises:

determining a mapping between the first transmission beam and the second transmission beam based at least in part on a table.

9. A method for wireless communication at a wireless device, comprising:

transmitting a plurality of transmission beams;

receiving channel state information (CSI) for the plurality of transmission beams, the CSI comprising CSI reported by a first user equipment (UE) and CSI reported by a second UE;

identifying a first transmission beam and a second transmission beam of the plurality of transmission beams based at least in part on the CSI;

transmitting, to the first UE, a first indication of the first transmission beam and the second transmission beam and, to the second UE, a second indication of the first transmission beam and the second transmission beam based at least in part on the reported CSI, wherein the first transmission beam is configured to convey initial transmissions from the second UE to the first UE and the second transmission beam is configured to convey retransmissions from the second UE to the first UE;

transmitting, to the first UE during a first interval, a first transmission of user data over the first transmission beam;

failing, after identifying the second transmission beam, to receive or decode an acknowledgment (ACK) message in response to the first transmission;

switching to the second transmission beam in response to failing to receive or decode the ACK message; and transmitting, to the first UE during a subsequent interval, a second transmission of the user data over the second transmission beam based at least in part on failing to receive or decode the ACK message.

10. The method of claim 9, wherein transmitting the plurality of transmission beams comprises transmitting the first transmission beam from a first transmission/reception point (TRP) and the second transmission beam from a second TRP.

11. The method of claim 9, further comprising:

computing a plurality of spatial diversity values between transmission beams of the plurality of transmission beams; and selecting the first transmission beam and the second transmission beam based at least in part on determining that a spatial diversity value computed between the first transmission beam and the second transmission beam exceeds a threshold.

12. The method of claim 11, further comprising:

computing a plurality of channel quality values for the plurality of transmission beams based at least in part on the CSI reported by the first UE, wherein computing the plurality of spatial diversity values comprises:

computing the plurality of spatial diversity values between transmission beams of a subset of the plurality of transmission beams having channel quality values exceeding a second threshold, wherein the subset of the plurality of transmission beams comprises the first transmission beam and the second transmission beam.

13. The method of claim 9, wherein receiving the CSI comprises receiving the CSI reported by the first UE from an access network entity.

14. The method of claim 13, wherein identifying the first transmission beam and the second transmission beam comprises receiving the first indication of the first transmission beam and the second transmission beam from the access network entity.

15. The method of claim 9, further comprising:

transmitting an indication of a plurality of periodic intervals during which the first UE is scheduled to receive initial transmissions of user data, wherein the plurality of periodic intervals comprises the first interval.

16. The method of claim 9, wherein transmitting the second transmission of the user data during the subsequent interval comprises transmitting control information in a control channel that indicates a location of the user data in a data channel.

17. The method of claim 9, wherein a spatial diversity between the first transmission beam and the second transmission beam exceeds a threshold.

18. The method of claim 9, further comprising:

generating a table that provides mappings between primary and fallback transmission beams based at least in part on the CSI; and transmitting, to the first UE, the table, wherein the table comprises a mapping between the first transmission beam and the second transmission beam.

19. A method for wireless communication at a first user equipment (UE), comprising:

transmitting a plurality of transmission beams;

receiving, from an access network entity, an indication of a first transmission beam of the plurality of transmission beams based at least in part on channel state information (CSI) reported to the access network entity by a second UE, wherein the first transmission beam is configured to convey initial transmissions from the first UE to the second UE;

identifying a second transmission beam of the plurality of transmission beams based at least in part on the indication, wherein the second transmission beam is configured to convey retransmissions from the first UE to the second UE;

transmitting, to the second UE during a first interval, a first transmission of user data over the first transmission beam;

failing to receive or decode an acknowledgment (ACK) message in response to the first transmission; and transmitting, to the second UE during a subsequent interval, a second transmission of the user data over the second transmission beam based at least in part on failing to receive or decode the ACK message.

20. The method of claim 19, further comprising:

switching from the first transmission beam to the second transmission beam based at least in part on failing to receive or decode the ACK message.

21. The method of claim 19, further comprising:

transmitting an indication of a plurality of periodic intervals during which the second UE is scheduled to receive initial transmissions of user data, wherein the plurality of periodic intervals comprises the first interval.

22. The method of claim 19, wherein transmitting the second transmission of the user data during the subsequent interval comprises transmitting control information in a control channel that indicates a location of the user data in a data channel.

23. The method of claim 19, wherein a spatial diversity between the first transmission beam and the second transmission beam exceeding a threshold.

24. The method of claim 19, wherein the indication indicates the second transmission beam.

25. The method of claim 19, wherein identifying the second transmission beam comprises:

determining a mapping between the first transmission beam and the second transmission beam based at least in part on a table.

26. A method for wireless communication at a first user equipment (UE), comprising:

receiving a plurality of transmission beams;

reporting, to an access network entity, channel state information (CSI) for the plurality of transmission beams;

receiving an indication of a first transmission beam of the plurality of transmission beams based at least in part on the reported CSI, wherein the first transmission beam is configured to convey initial transmissions from the first UE to a second UE;

identifying a second transmission beam of the plurality of transmission beams based at least in part on the indication, wherein the second transmission beam is configured to convey retransmissions from the first UE to the second UE;

transmitting, during a first interval, a first transmission of user data over the first transmission beam;

receiving, after identifying the second transmission beam, a negative acknowledgment (NACK) message based at least in part on the first transmission;

switching to the second transmission beam in response to receiving the NACK message; and transmitting, during a subsequent interval, a second transmission of the user data over the second transmission beam based at least in part on receiving the NACK message.

27. The method of claim 26, wherein the indication indicates the second transmission beam.

28. The method of claim 26, wherein identifying the second transmission beam comprises:

determining a mapping between the first transmission beam and the second transmission beam based at least in part on a table.

* * * * *